US010798619B2

(12) United States Patent
Nigam et al.

(10) Patent No.: US 10,798,619 B2
(45) Date of Patent: Oct. 6, 2020

(54) METHOD AND APPARATUS FOR PERFORMING HANDOVER OF USER EQUIPMENT IN WIRELESS COMMUNICATION SYSTEM SUPPORTING DUAL CONNECTIVITY

(71) Applicant: Samsung Electronics Co., Ltd., Gyeonggi-do (KR)

(72) Inventors: Anshuman Nigam, Karnataka (IN); Jungsoo Jung, Gyeonggi-do (KR); Jungmin Moon, Gyeonggi-do (KR); Sunheui Ryoo, Gyeonggi-do (KR); Sungjin Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 760 days.

(21) Appl. No.: 14/608,936

(22) Filed: Jan. 29, 2015

(65) Prior Publication Data
US 2015/0215824 A1 Jul. 30, 2015

(30) Foreign Application Priority Data

Jan. 29, 2014 (KR) .......................... 10-2014-0011821

(51) Int. Cl.
*H04W 36/00* (2009.01)
*H04W 36/28* (2009.01)
(Continued)

(52) U.S. Cl.
CPC ....... *H04W 36/0055* (2013.01); *H04W 36/00* (2013.01); *H04W 36/0069* (2018.08);
(Continued)

(58) Field of Classification Search
CPC ... H04W 88/06; H04W 76/025; H04W 36/08; H04W 36/0072; H04W 36/00;
(Continued)

(56) References Cited

U.S. PATENT DOCUMENTS 8,295,841 B2  10/2012 Hwang et al.
2014/0370897 A1  12/2014 Vesterinen et al.
(Continued)

FOREIGN PATENT DOCUMENTS

WO  WO 2011/142544  11/2011
WO  WO 2013/091200  6/2013

OTHER PUBLICATIONS

SeNB Chang (Release 12), 3GPP TS 36.300 V12.4.0, Dec. 2014.
(Continued)

*Primary Examiner* — Jae Y Lee
*Assistant Examiner* — Aixa A Guadalupe Cruz
(74) *Attorney, Agent, or Firm* — The Farrell Law Firm, P.C.

(57) ABSTRACT

A method of supporting a Handover (HO) by a master evolved Node B (eNB) in a wireless communication system supporting dual connectivity of a User Equipment (UE) for the master eNB and a slave eNB is provided. The method includes when an HO of the UE to the slave eNB is determined, transmitting an HO request message to a target slave eNB, when a HO Ack message is received from the target slave eNB, transmitting an HO trigger request message including identification information of the target slave eNB to a source slave eNB, and when a resource release message is received from the target slave eNB, transmitting an HO success indicator to the source slave eNB.

18 Claims, 17 Drawing Sheets

(51) Int. Cl.
    *H04W 36/30* (2009.01)
    *H04L 5/00* (2006.01)
    *H04W 88/06* (2009.01)
(52) U.S. Cl.
    CPC .............. *H04W 36/28* (2013.01); *H04L 5/001* (2013.01); *H04W 36/30* (2013.01); *H04W 88/06* (2013.01)
(58) Field of Classification Search
    CPC . H04W 36/32; H04W 36/28; H04W 36/0027; H04W 36/0033; H04W 36/00837; H04W 36/06; H04W 36/0069; H04L 5/001
    See application file for complete search history.

(56) References Cited

U.S. PATENT DOCUMENTS

| | | | |
|---|---|---|---|
| 2015/0111580 A1* | 4/2015 | Wu | H04W 36/0005 455/436 |
| 2015/0351139 A1* | 12/2015 | Zhang | H04L 1/1887 370/329 |
| 2016/0135103 A1* | 5/2016 | Lee | H04W 28/08 455/444 |

OTHER PUBLICATIONS

NSN, Nokia Corporation, "Handover Procedure in Case of Bearer only Served by SeNB (1A)", R3-132101, 3GPP TSG-RAN WG3 Meeting #82, Nov. 11-15, 2013.

NSN, Nokia Corporation, "Handover Procedure in Case of Bearer Served by MeNB and SeNB (3C)", R2-132102, 3GPP TSG-RAN WG3 Meeting #82, Nov. 11-15, 2013.

3rd Generation Partnership Project; Technical Specification Group Radio Access Network; Study on Small Cell Enhancements for E-UTRA and E-UTRAN.

Higher Layer Aspects (Release 12), 3GPP TR 36.842 V12.0.0, Dec. 2013.

International Search Report dated May 6, 2015 issued in counterpart application No. PCT/KR2015/000943.

Pantech, "Comparing PDCP Split (1A/2A) and RLC Split (2C) for Impacts on SN Status Transfer and Data Forwarding During SeNB Change", R2-133551, 3GPP TSG-RAN WG2 Meeting #83bis, Oct. 7-11, 2013, 5 pages.

Chinese Office Action dated May 30, 2019 issued in counterpart application No. 201580006406.3, 20 pages.

* cited by examiner

METHOD AND APPARATUS FOR PERFORMING HANDOVER OF USER EQUIPMENT IN WIRELESS COMMUNICATION SYSTEM SUPPORTING DUAL CONNECTIVITY

PRIORITY

This application claims priority under 35 U.S.C. § 119(a) to Korean Patent Application No. 10-2014-0011821, which was filed in the Korean Intellectual Property Office on Jan. 29, 2014, the entire invention of which is incorporated herein by reference.

BACKGROUND OF THE INVENTION

1. Field of the Invention

The present invention relates generally to a wireless communication system, and more particularly, to a method and an apparatus for performing a Handover (HO) of a User Equipment (UE) in a wireless communication system supporting dual connectivity.

2. Description of the Related Art

In general, a mobile communication system was developed to provide voice services, and has gradually expanded its service area to include a data service as well as a voice service and has recently been developed to provide a high speed data service. However, since resources are lacking and users are demanding higher speed services from mobile communication systems currently providing services, an improved mobile communication system is needed.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving networks, cooperative communication, Coordinated Multi-Points (CoMP), reception-end interference cancellation and the like.

In the 5G system, Hybrid FSK and QAM Modulation (FOAM) and sliding window superposition coding (SWSC), as an advanced coding modulation (ACM), and filter bank multi carrier (FBMC), non-orthogonal multiple access (NOMA), and sparse code multiple access (SCMA), as an advanced access technology, have been developed.

Meanwhile, dual connectivity may mean that one UE is connected to two Evolved Node Bs (eNBs) to receive services. For example, the dual connectivity may mean that one UE is connected to as macro eNB and a small (pico) eNB which have different functions to receive services.

A dual connectivity technology is being actively discussed by current communication standard organizations. Particularly, in the dual connectivity technology, a method of handing over a UE is urgently needed since a procedure thereof has not yet been defined.

SUMMARY OF THE INVENTION

The present invention has been made to address at least the above mentioned problems and/or disadvantages and to provide at least the advantages described below.

An aspect of the present invention provides a method of supporting an HO by a master eNB in a wireless communication system supporting dual connectivity of a UE for the master eNB and a slave eNB. The method includes when an HO of the UE to the slave eNB is determined, transmitting an HO request message to a target slave eNB, when a HO Ack message is received from the target slave eNB, transmitting an HO trigger request message including identification information of the target slave eNB to a source slave eNB and when a resource release message is received from the target slave eNB transmitting an HO success indicator to the source slave eNB.

An aspect of the present invention provides a method of supporting an HO by a master eNB in a wireless communication system supporting dual connectivity of a UE for the master eNB and a slave eNB. The method includes when an HO of the UE to the master eNB is determined, transmitting an HO request message to a target master eNB, when an HO Ack message is received from the target master eNB, transmitting an HO trigger indicator to a source slave eNB, and when a resource release message is received from the target master eNB, transmitting an HO success indicator to the source slave eNB.

Another aspect of the present invention provides a master eNB for supporting an HO in a wireless communication system supporting dual connectivity of a UE for the master eNB and a slave eNB. The master eNB includes a transceiver configured to transmit/receive signals to/from the UE or nodes of the wireless communication system and a controller configured to transmit an HO request message to a target slave eNB when an HO of the UE to the slave eNB is determined, to transmit an HO trigger request message including identification information for the target slave eNB to a source slave eNB when an HO Ack message is received from the target slave eNB, and to transmit an HO success indicator to the source slave eNB when a resource release message is received from the target slave eNB.

Another aspect of the present invention provides a master eNB for supporting an HO in a wireless communication system supporting dual connectivity of a UE for the master eNB and a slave eNB. The master eNB includes a transceiver configured to transmit/receive signals to/from the UE or nodes of the wireless communication system and a controller configured to transmit an HO request message to a target master eNB when an HO of the UE to the master eNB is determined, to transmit an HO trigger indicator to a source slave eNB when an HO Ack message is received from the target master eNB, and to transmit an HO success indicator to the source slave eNB when a resource release message is received from the target master eNB.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. Those of ordinary skill in the art will recognize that various changes and modifications of the embodiments described herein can be made without departing from the scope of the present invention. In addition, descriptions of well-known functions and constructions may be omitted for clarity and conciseness. The same reference symbols are used throughout the drawings to refer to the same or like parts.

It should be noted that various embodiments described below may be applied or used individually or in combination.

Figure 1:
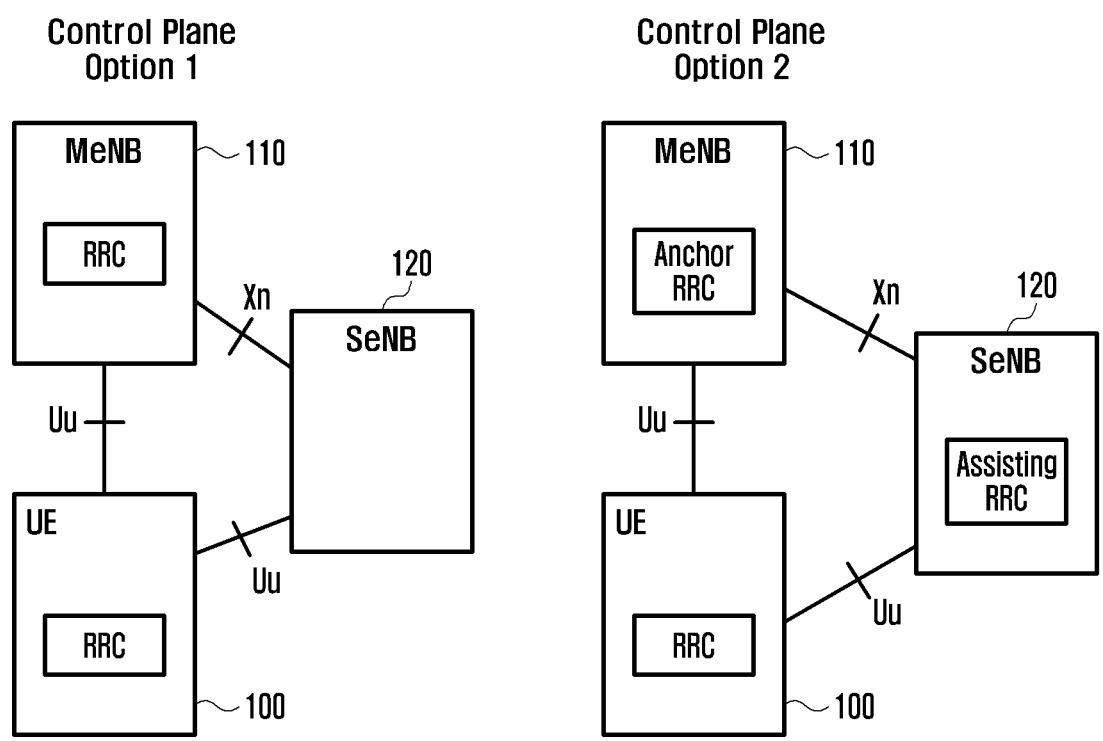
FIG. 1 is a block diagram illustrating characteristics of dual connectivity, according to an embodiment of the present invention.

FIG. 1 is a block diagram illustrating characteristics of dual connectivity, according to an embodiment of the present invention.

A UE 100 is simultaneously connected to both a macro eNB 110 and a pico eNB 120. The macro eNB 110 and the pico eNB 120 provide services to the UE 100.

A radio resource control function may be provided to the UE 100 by both the macro eNB 110 and the pico eNB 120 or by one of the macro eNB 110 and the pico eNB 120.

A main objective of the dual connectivity is to increase throughput of the UE 100 through connections between the UE 100 and one or more eNBs for data transmission/reception. Further, one eNB which is the macro eNB 110 may serve as an anchor point for mobility by serving as a Master eNB (MeNB) to help with processing mobility of the UE 100.

Figure 2:
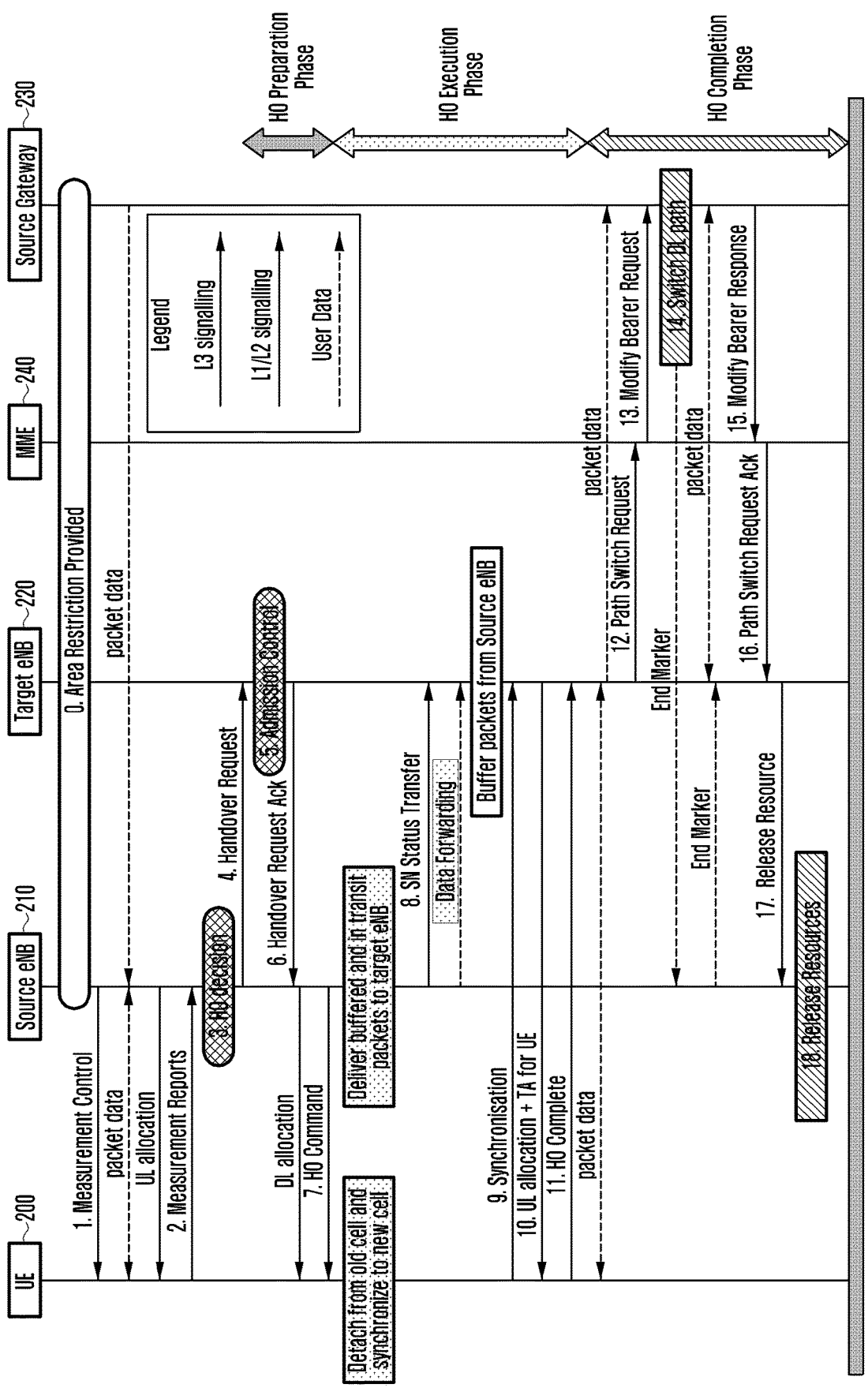
FIG. 2 is a signaling diagram illustrating an HO process in a single connectivity system, according to an embodiment of the present invention.

FIG. 2 is a signaling diagram illustrating an HO process in a single connectivity system, according to an embodiment of the present invention.

As illustrated in FIG. 2, an HO preparation step may start after a source eNB 210 determines an HO (by selecting a target eNB) based on a measurement report from the UE 200.

The source eNB 210 determines whether to accept an HO request and transmits an HO request message to a selected target eNB 220. When the target eNB 220 accepts the UE 200 based on Quality of Service (QoS) of an active flow of the UE 200 and a load condition thereof, an HO execution step is initiated. Otherwise, the source eNB 210 may not select another eNB as the target eNB.

In the HO execution step, the source eNB 210 transmits buffers and in-transit packets to the target eNB 220 and transmits an HO command to the UE 200.

The UE 200 having received the HO command starts wireless interface synchronization with the target eNB 220, completes the synchronization, and then transmits an HO completion to the target eNB 220. After the target eNB 220 receives the HO completion, an HO completion step is initiated in which the target eNB 220 starts a path switch process with a source gateway 230.

After the path, switch is performed, the target eNB 220 informs the source eNB 210 that the HO has been sufficiently completed.

Thereafter, the source eNB 210 releases resources of the UE 200.

The above description will be explained in more detail with respect to FIG. 2. At step 0, an area restriction is provided. At step 1, measurement control is initiated at the UE 200. At step 2, measurement reports are exchanged between the UE 200 and the source eNB 210. At step 3, an HO decision is determined at the source eNB 210. At step 4, an HO request is transmitted from the source eNB 210 to the target eNB 220. At step 5, an admission control is initiated. At step 6, an HO request Acknowledgement (Ack) is transmitted from the target eNB 220 to the source eNB 210. At step 7, an HO command signal is transmitted from the source eNB 210 to the UE 200. At step 8, an SN (Sequence Number) status transfer signal is transferred from the source eNB 210 to the target eNB 220. At step 9, synchronization between the UE 200, the source eNB 210, and the target eNB 220 is performed. At step 10, UL allocation and TA allocation is provided for UE 200. At step 11, an HO complete signal is transmitted from the UE 200 to the target eNB 220. At step 12, a path, switch request signal is transmitted from the target WE 220 to an MME (Mobility Management Entity) 240. At step 13, a modify bearer request signal is transmitted from the MME 240 to the source gateway 230. At step 14, a switch DL path signal is transmitted from the source gateway 230 to the source eNB 210. At step 15, a modify bearer response signal is transmitted from the source gateway 230 to the MME 240. At step 16, a path switch request Ack signal is transmitted from the MME 240 to the target eNB 220. At step 17, a release resource signal is transmitted from the target eNB 220 to the source eNB 210. At step 18, the source eNB 210 determines to release resources.

Figure 3B:
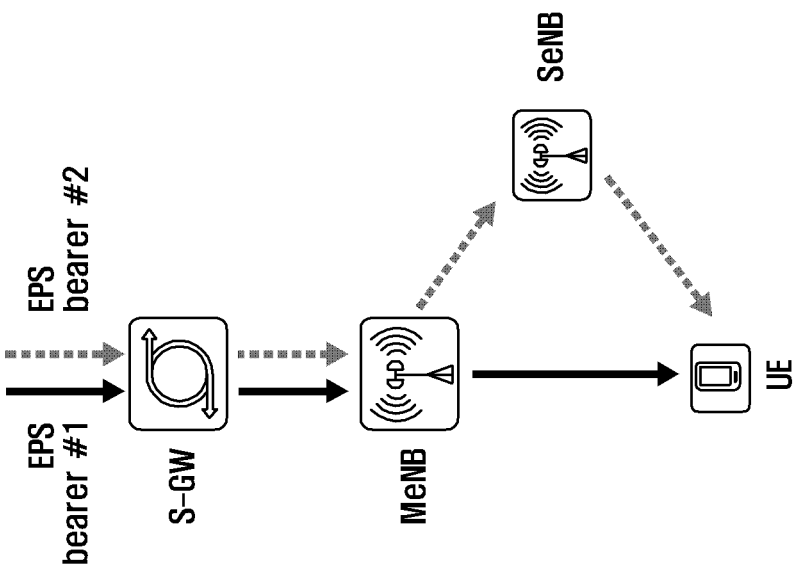
FIGS. 3A and 3B are diagrams illustrating various types of dual connectivity, according to an embodiment of the present invention.
Figure 3A:
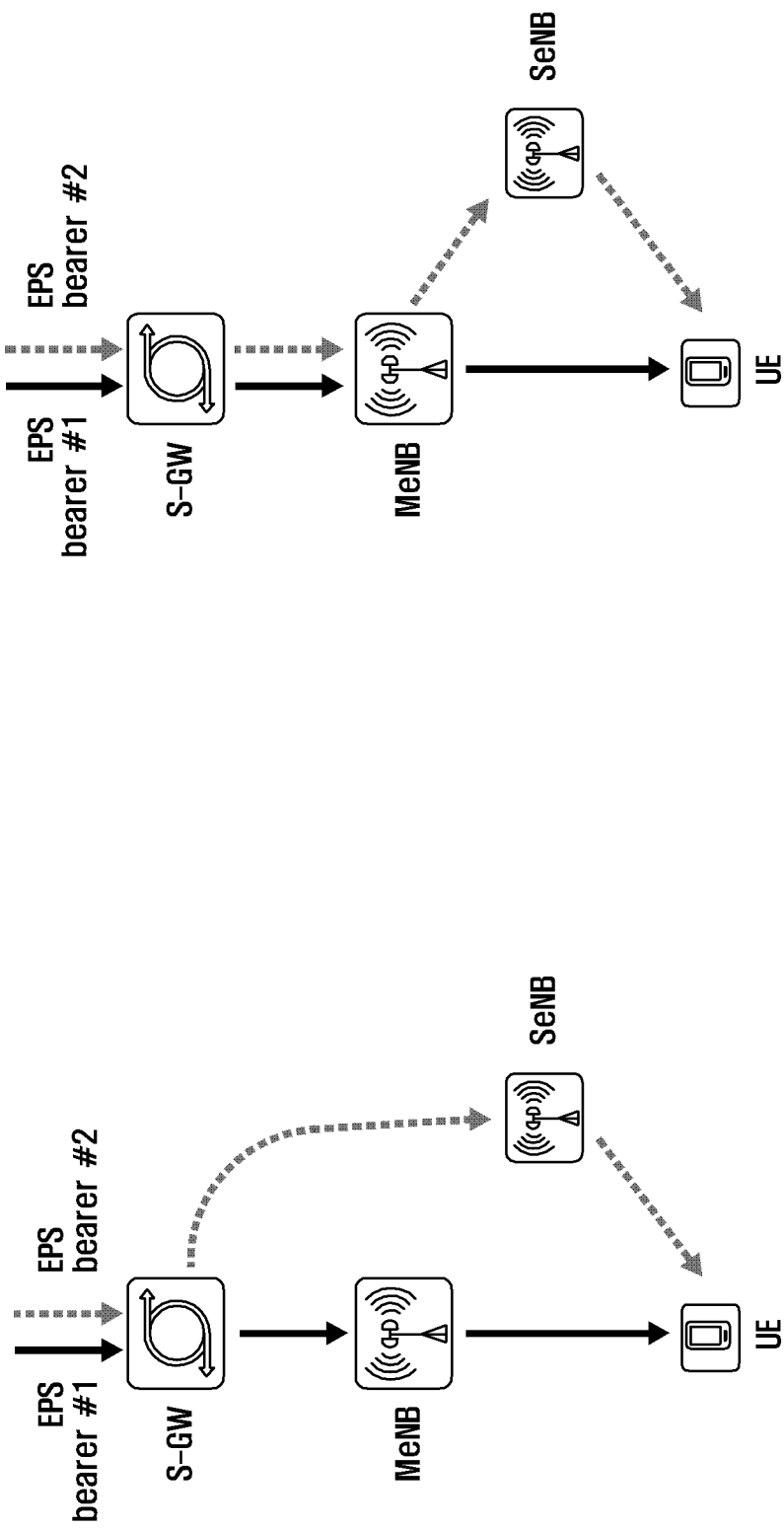

FIGS. 3A and 3B are diagrams illustrating various types of dual connectivity, according to an embodiment of the present invention.

First, FIG. 3A illustrates a structure in which a bearer formed between a data network and a UE is split from a core network.

As illustrated in FIG. 3A, when a first EPS (Evolved Packet Core) bearer and a second EPS bearer are formed between the data network and the UE, the first EPS bearer is connected to the UE via an MeNB in the core network, but the second EPS bearer is split from the core network node (for example, a Source Gateway (SGW)) into an SeNB and connected to the UE.

FIG. 3B illustrates a structure in which a bearer formed between a data network and the UE is split from a radio access network.

As illustrated in FIG. 3B, when a first EPS bearer and a second EPS bearer are formed between the data network and the UE, the first EPS bearer is connected to the UE via a MeNB in the core network, but the second EPS bearer is split from an RAN node, for example, the MeNB into an SeNB and connected to the UE.

With continued reference to FIGS. 3A and 3B, a process of handing over the MeNB and the Selma according to the types of dual connectivity illustrated in FIGS. 3A and 3B is now described.

Further, the HO according to the present invention may be classified into a HO for a single link and a HO for a dual link.

The HO for the single link may mean that, in a state where the UE is connected to a macro eNB and a pico eNB a link with the macro eNB or a link with the pico eNB is handed over.

The HO for the dual link may mean that both the link with the macro eNB (and the like) and the pico eNB are handed over.

The MeNB may refer to a macro eNB and the SeNB may refer to a small eNB or a pico eNB. More specifically, the macro eNB may be the MeNB leading the HO, and the small eNB or the pico eNB may be the SeNB performing the HO, according to an instruction from the MeNB.

Further, although it is assumed that the macro eNB is the MeNB and the small eNB or the pico eNB is the SeNB in the following embodiments, the present invention is not limited thereto and vice versa.

First, a HO method for the single link will be described with reference to FIGS. 4-7.

Combinations of the HO for the single link and the types of dual connectivity may be specifically divided into a pico link HO process of an RAN split scenario, a macro link HO process or an RAN split scenario, a pico link HO process of a CN split scenario, and a macro link HO process of a CN split scenario.

The pico link HO process of the RAN split scenario will be described first.

In the RAN split scenario, when a HO of the pico eNB in dual connectivity is performed by the macro eNB after an HO is determined, the macro eNB transmits an HO request to a selected target pico eNB, and the pico eNB performs an admission control based on the HO request and then transmits an Ack to the macro eNB.

When receiving a positive Ack, the macro eNB transmits the request to a source pico eNB to trigger data and context transmission to the target pico eNB, and also transmits an HO command to the UE.

When receiving the HO command, the UE starts radio interface synchronization with the target pico eNB, completes the synchronization, and then transmits an HO completion to the target pico eNB.

When receiving the HO completion, the target pico eNB transmits an HO Ack indication to the macro eNB. The macro eNB switches the corresponding flow to the pico eNB and transmits the indication to the source pico eNB, so as to release resources for the UE.

Data transmission is performed by the target pico eNB together with the macro eNB for providing the UE in a dual connectivity state.

The above process will be described in detail with reference to FIG. 4.

Figure 4:
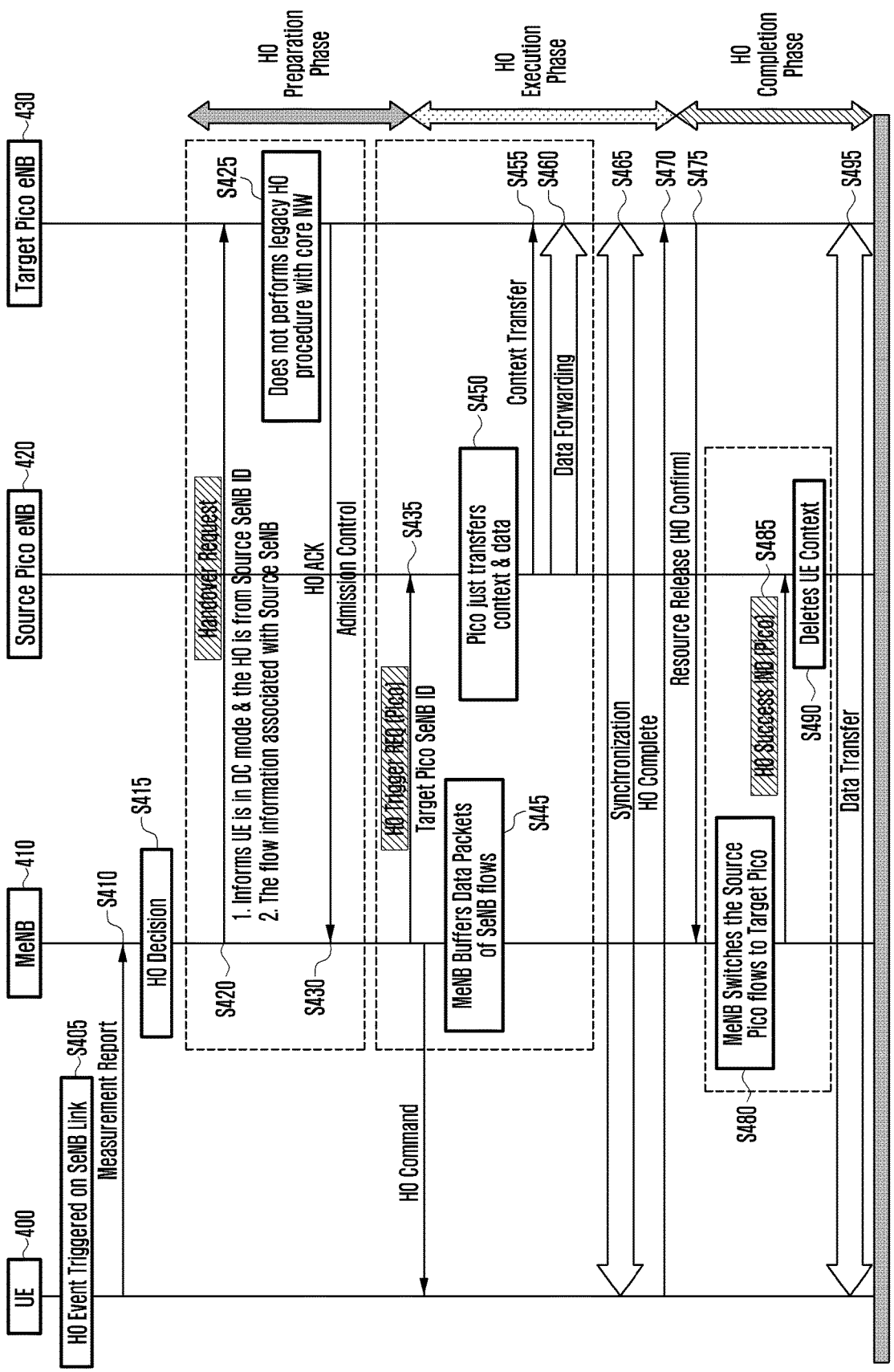
FIG. 4 is a signaling diagram illustrating a pico link (HO) process of a RAN split scenario, according to an embodiment of the present invention.

FIG. 4 is a signaling diagram illustrating a pico link HO process of a RAN split scenario, according to an embodiment of the present invention.

As illustrated in FIG. 4, at step S405, a UE 400 triggers an HO on an SeNB link. Accordingly, the UE 400 transmits a measurement report message to a MeNB 410, at step to S410, and the MeNB 410 determines whether to perform the HO based on the measurement report, at step S415.

Further, the MeNB 410 transmits an HO request message to a target pico eNB 430, at step S420. The HO request message may include indication information indicating that the HE 400 is in a dual connectivity mode, information indicating that the HO is from a source SeNB ID, and flow information related to the source SeNB.

The target pico eNB 430 does not perform a HO process with a conventional core network, at step S425. That is, the Ho described in FIG. 4 is for the RAN split. More particularly, since the target pico eNB 430 is connected to the MeNB 410, the target pico eNB 430 does not need to form a separate connection with the core network. Since the target pico eNB 430 is connected to a core network node (for example, an SGW) in the CN split, which will be described below, the target pico eNB 430 needs to perform the HO process with the core network.

Further, the target pico eNB 430 transmits an HO Ack message to the MeNB 410, at step S430. Then, the MeNB 410 transmits a HO trigger request message (pico) to a source pico eNB 420, at step S435. In this case, the HO trigger request message may include an identifier of the target pico eNB 430. The HO trigger request message may trigger the source SeNB 420 to transmit context information to the target eNB 430, which will be described below.

Thereafter, the MeNB 410 buffers a data packet which has been transmitted to the source pico SeNB 420.

Further, the source pico eNB 420 transmits context and data to the target pico eNB 430, at steps S450 and S460.

Thereafter, the UE 400 and the target pico eNB 430 perform synchronization, at step S465, and the UE 400 transmits a HO completion message to the target pico eNB 430, at step S470.

Then, the target pico eNB 430 transmits a resource release (HO Ack) message to the MeNB 410, at step S475. Then, the MeNB 410 switches flows for the UE 400 to the target pico eNB 430 from the existing source pico eNB 420, at step S480.

Further, the MeNB 480 transmits a HO success indicator (pico) to the source pico eNB 420, at step S485, and the source pico eNB 420 deletes context for the UE 400, at step S490.

Thereafter, the UE 400 transmits/receives data to/from the target pico eNB 430.

The above described embodiment will be summarized as follows.

HO Preparation Phase
HO request
Source macro→target pico
Indicate HO from pico eNB
Target pico eNB does not initiate any HO process in completion phase
HO Execution Phase
HO trigger request (REQ)
Source macro→source pico
Source pico transmits only data and context
Source macro buffers only data packet of pico flow
HO Completion Phase
HO Ack
Target pico→source macro
Switch pico flows to target pico
HO success indicator (IND)
Source macro→source pico
Source pico deletes UE context Next, the macro link HO process of the RAN split scenario will be described.

In the RAN split scenario, when the HO of the macro eNB in a dual connectivity state is performed after the HO is determined, the macro eNB transmits the HO request to the selected target macro eNB.

Then, the target macro eNB performs an admission control based on the HO request and transmits an Ack to the macro eNB. In the HO request, the macro eNB includes information indicating that the UE is in a dual connectivity state with an eNB ID of the related pico eNB and flow information on flows related to the pico eNB.

When receiving a positive Ack, the macro eNB transmits an indication to the related pico eNB to indicate the HO of the macro layer starts with a macro eNB ID, and also starts buffering of all flows and transmits an HO command to the UE. When receiving the indication, the pico eNB may buffer any control message until the HO of the macro layer is completed.

When receiving the HO command, the UE starts radio interface synchronization with the target macro eNB, completes the synchronization, and then transmits an HO completion to the target macro eNB. When receiving the HO completion, the target macro eNB performs conventional HO execution and completion phase processes.

After receiving the HO Ack from the target macro eNB, the source macro eNB transmits an indication to the related pico eNB to indicate that the HO is completed by the macro layer. Data transmission is performed by the target macro eNB together with the related pico eNB to provide the UB in the dual connectivity state.

The above description will be made in detail with reference to FIG. 5.

Figure 5:
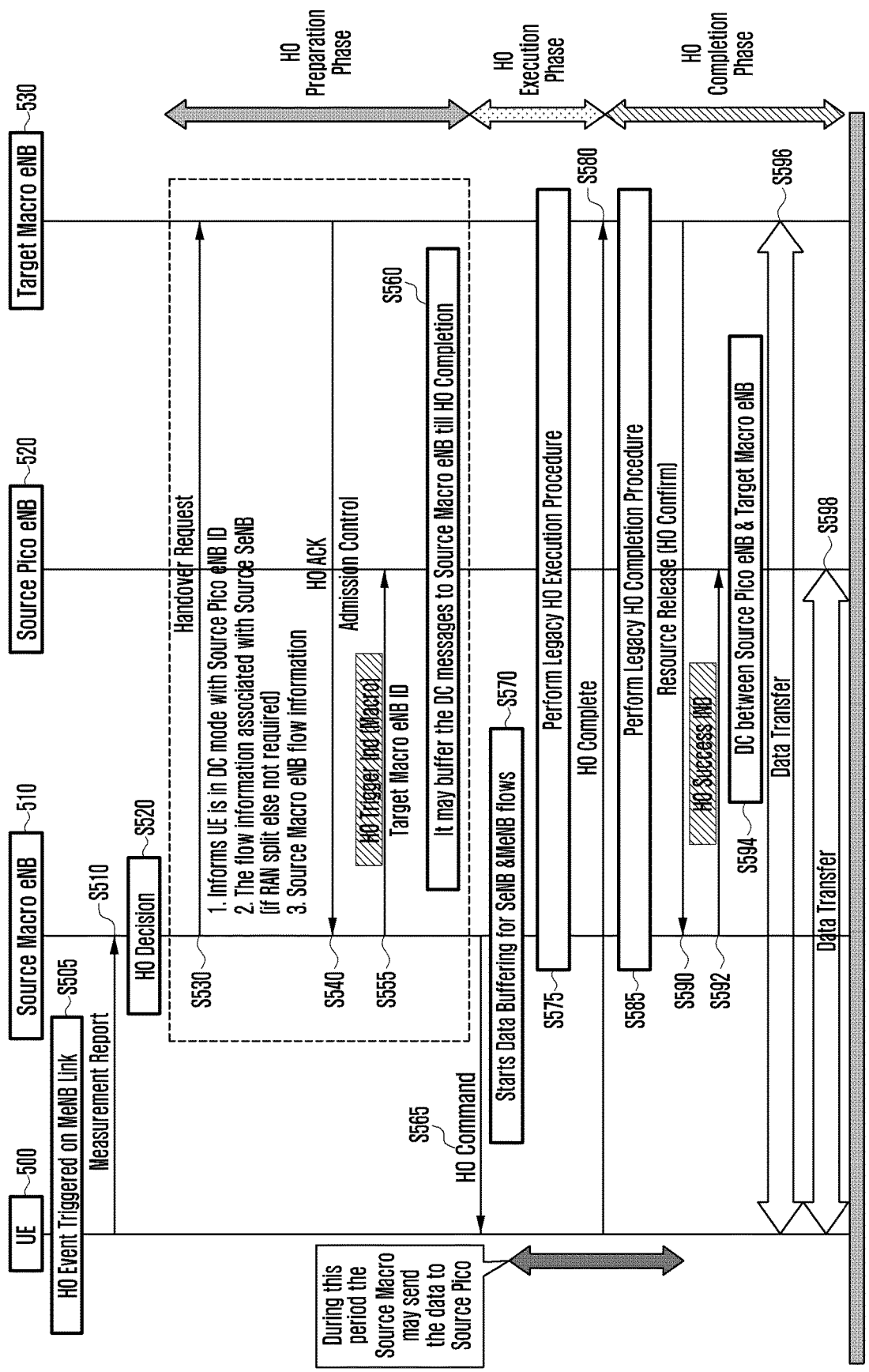
FIG. 5 is a signaling diagram illustrating a macro link HO process of a RAN (Radio a Access Network) split scenario, according to an embodiment of the present invention.

FIG. 5 is a signaling diagram illustrating a macro link HO process of a RAN split scenario according to an embodiment of the present invention.

As illustrated in FIG. 5, at step S505, a UE 500 triggers a HO on a MeNB link. Accordingly, the UE 500 transmits a measurement report message to a source macro eNB 510, at step S510, and the source macro eNB 510 determines whether to perform the HO based on the measurement report, at step S520.

Further, the source macro eNB 510 transmits a HO request message to a target macro eNB 530, at step S520. The HO request message may include indication information indicating that the UE is in a dual connectivity mode, an identifier of a source pico eNB in a dual connectivity mode, flow information related to the source pico eNB, and source macro eNB flow information.

Then, the target macro eNB 530 transmits a HO Ack message to the source macro eNB 510, at step S540. Then, the source macro eNB 510 transmits a HO trigger indication message (macro) to a source pico eNB 520, at step S555. In this case, the HO trigger indication message may include an identifier of the target macro eNB 530. The HO trigger indication message may instruct the source pico eNB 520 to buffer a dual connectivity (DC) message (or a DC-related message) and then transmit the DC message to the target macro eNB 530 at a proper time.

Further, the source pico eNB 520 may buffer the DC message in the source macro eNB 510 until the HO is completed. The DC message may include one or more pieces of information required for processing dual connectivity. The buffered DC message may be used for forming the dual connectivity between the source pico eNB 520 and the target macro eNB 530, at step S594, which will be described below.

Thereafter, the source macro eNB 510 transmits a HO command message to the UE 500, at step S565. Further, the source macro eNB 510 initiates data buffering for SeNB and MeNB flows, at step S570.

In addition, the source macro eNB 510 and the target macro eNB 530 perform a HO execution process, at step S575.

The UE 500 transmits a HO completion message to the target macro eNB 530, at step S580. Then, the source macro eNB 510 and the target macro eNB 530 perform a HO completion process, at step S585.

The target macro eNB 530 transmits a resource release message to the source macro eNB 510, at step S590. Then, the source macro eNB 510 transmits a HO success indicator to the source pico eNB 520, at step S592, and dual connectivity is formed between the source pico eNB 520 and the target macro eNB 530, at step S594. In this case, the DC message that is buffered at step S560 may be used.

The UE 500 transmits/receives data to/from the source pico eNB 520 and the target macro eNB 530, at steps S596 and S598.

The above described embodiment may be summarized as follows.

HO Preparation Phase
HO request
Indicate that UE is in DC state with source pico (ID)
Progress flow information on bath macro and pico
HO Trigger IND
Source macro→source pico
source pico buffers DC message
HO Execution Phase Apply conventional HO process
HO completion Phase
Apply conventional HO process
HO success IND
Source macro→source pico
Source pico performs DC with target macro
HO Request
Indicate UE DC mode (together with source pico ID)
Target macro should accept DC mode
Progress flow information on both macro and pico
HO Trigger IND
Target macro ID
Source pico buffers DC message until HO completion
UE ID
HO Success IND
Macro Layer
Source pico performs DC with target macro
UE ID Next, the pico link HO process of the CN split scenario will be described.

In the CN split scenario, when the pico eNB HO in the dual connectivity mode is performed after the HO is determined by the macro eNB, the macro eNB transmits an HO request including that the UE is in a dual connectivity state together with the macro eNB to the selected target pico eNB. The target pico eNB performs an admission control based on the HO request and transmits an Ack to the macro eNB.

When receiving a position Ack, the macro eNB transmits a request for triggering data and context transmission to the target pico eNB to the source pico eNB, and also transmits an HO command.

When receiving the HO command, the UE starts radio interface synchronization with the target pico eNB, completes the synchronization, and then transmits an HO completion to the target pico eNB.

When receiving the HO completion, the target pico eNB performs a conventional HO completion phase process and transmits an HO Ack indication to the macro eNB.

The macro eNB switches the corresponding flow to the pico eNB and transmits an indication to the source pico eNB, so as to release resources for the UE. Data transmission is performed by the target pico eNB together with the macro eNB providing the UE in the dual connectivity state.

A detailed process of the above phases will be described with reference to FIG. 6.

Figure 6:
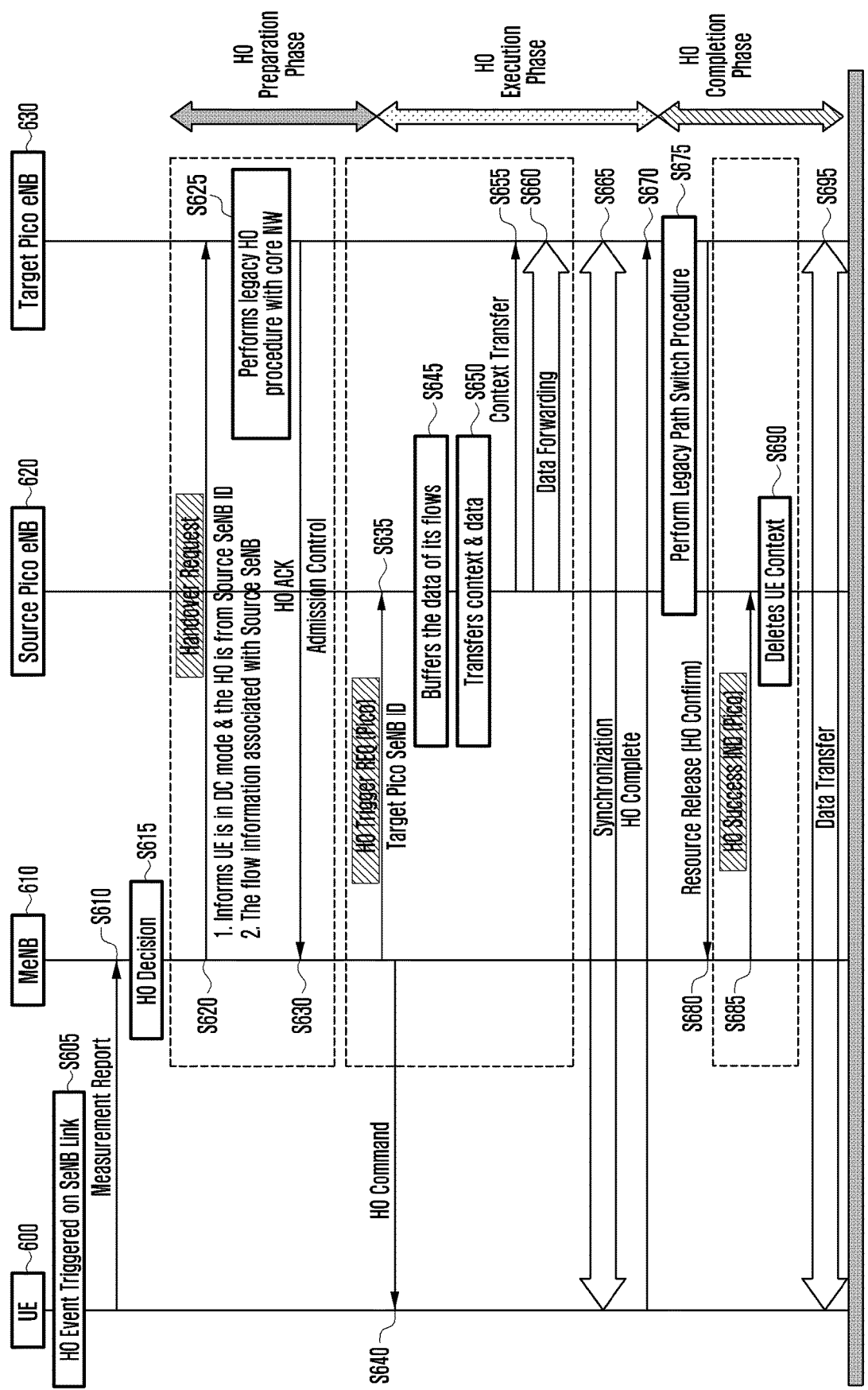
FIG. 6 is a signaling illustrating a pico link HO process of a CN (Core Network) split scenario, according to an embodiment of the present invention.

FIG. 6 is a signaling illustrating a pico link HO process of a CN split scenario, according to an embodiment of the present invention.

As illustrated in FIG. 6, at step S605, a UE 600 triggers an HO on an SeNB link. Accordingly, the UE 600 transmits a measurement report message to an MeNB 610, at step S610, and the MeNB 610 determines whether to perform the HO based on the measurement report, at step S615.

Further, the MeNB 610 transmits an HO request message to a target pico eNB 630, at step S620. The HO request message may include indication information indicating that the HE 600 is in a dual connectivity mode, information indicating that the HO is from a source SeNB ID, and flaw information related to the source SeNB.

Then, the target pico eNB 630 may perform a conventional HO process with a core network, at step S625. Further, the target pico eNB 630 transmits an HO Ack message to the MeNB 610, at step S630.

Then, the MeNB 610 transmits an HO trigger request message (pico) to the source pico eNB 620, at step S635. In this case, the HO trigger request message may include an to identifier of the target pico eNB 530. Further, the MeNB 610 may transmit an HO command message to the HE 600, at step S640.

Further, the source pico eNB 620 buffers data an flows, at step S645, and triggers UE 600 context and data transmission, at step S650. Accordingly, the source pico eNB 620 transmits UE 600 context to the target pico eNB 630, at step S655, and transmits data to the target pico eNB 630, at step S660.

Thereafter, at step S665, the UE 600 performs synchronization with the target pico eNB 630. Further, the UE 600 transmits an HO completion message to the target pico eNB 630, at step S670.

Then, the source pico eNB 620 and the target pico SeNB 630 perform a path switch process, at step 675. A conventional path switch process may be used as the path switch process.

The target pico eNB 630 may transmit a resource release message (HO Ack) to the MeNB 610, at step 680.

Then, the MeNB 610 transmits an HO success indicator (pico) to the source pico eNB 620, at step S685, and the source pico eNB 620 deletes UE 600 context, at step S690.

Thereafter, the UE 600 and the target pico eNB 630 transmit/receive data, at step S695.

The above described embodiment may be summarized as follows.

HO Preparation Phase
HO request
Source macro→target pico
Indicates HO from pico eNB
Start conventional HO process in target pico eNB completion step
HO Execution Phase
HO trigger REQ
Source macro→source pico
Source pico buffers data packets of flow
Source pico performs data and context transmission
HO Completion Phase
HO Ack
Target pico→source macro
After conventional path switch process is completed in core network
HO Success IND
Source macro→source pico
Source pico deletes UE context
HO Request
Indicate UE DC mode
Target pico should accept DC mode
HO is from related source pico (together with ID)
Target pico accepts data transmitted from source pico
Information on now of only source pico
Admission control
HO Trigger REQ
Target pico ID
Transmit data to target pico
UE ID
HO Success IND
Pico layer
Delete UE context
UE ID Next, the macro link HO process of the CN split scenario will be described.

In the CN split scenario, when the HO of the macro eNB in a dual connectivity state is performed after the HO is determined by the macro eNB, the macro eNB transmits the HO is request to the selected target macro eNB. The target macro eNB performs an admission control based on the HO request and transmits an Ack to the macro eNB.

In the HO request, the macro eNB includes information indicating that the UE is in the ducal connectivity state together with an eNB ID of the related pico eNB. When receiving a positive Ack, the macro eNB transmits an indication indicating that an HO of a macro layer starts with the target macro eNB ID to the related pico eNB and also transmits an HO command.

When receiving the indication, the pico eNB may also buffer a control message until the HO of the macro layer is completed.

When receiving the HO command, the UE starts radio interface synchronization with the target macro eNB, completes the synchronization, and then transmits an HO completion to the target macro eNB.

When receiving the HO completion, the target macro eNB performs conventional HO execution and completion phase processes.

After receiving the HO Ack from the target macro eNB, the source macro eNB transmits an indication indicating that the HO is completed by the macro layer to the related pico eNB. Data transmission is performed by the target macro eNB together with the related pico eNB providing the UE is the dual connectivity state.

The above process will be described in detail with reference to FIG. 7.

Figure 7:
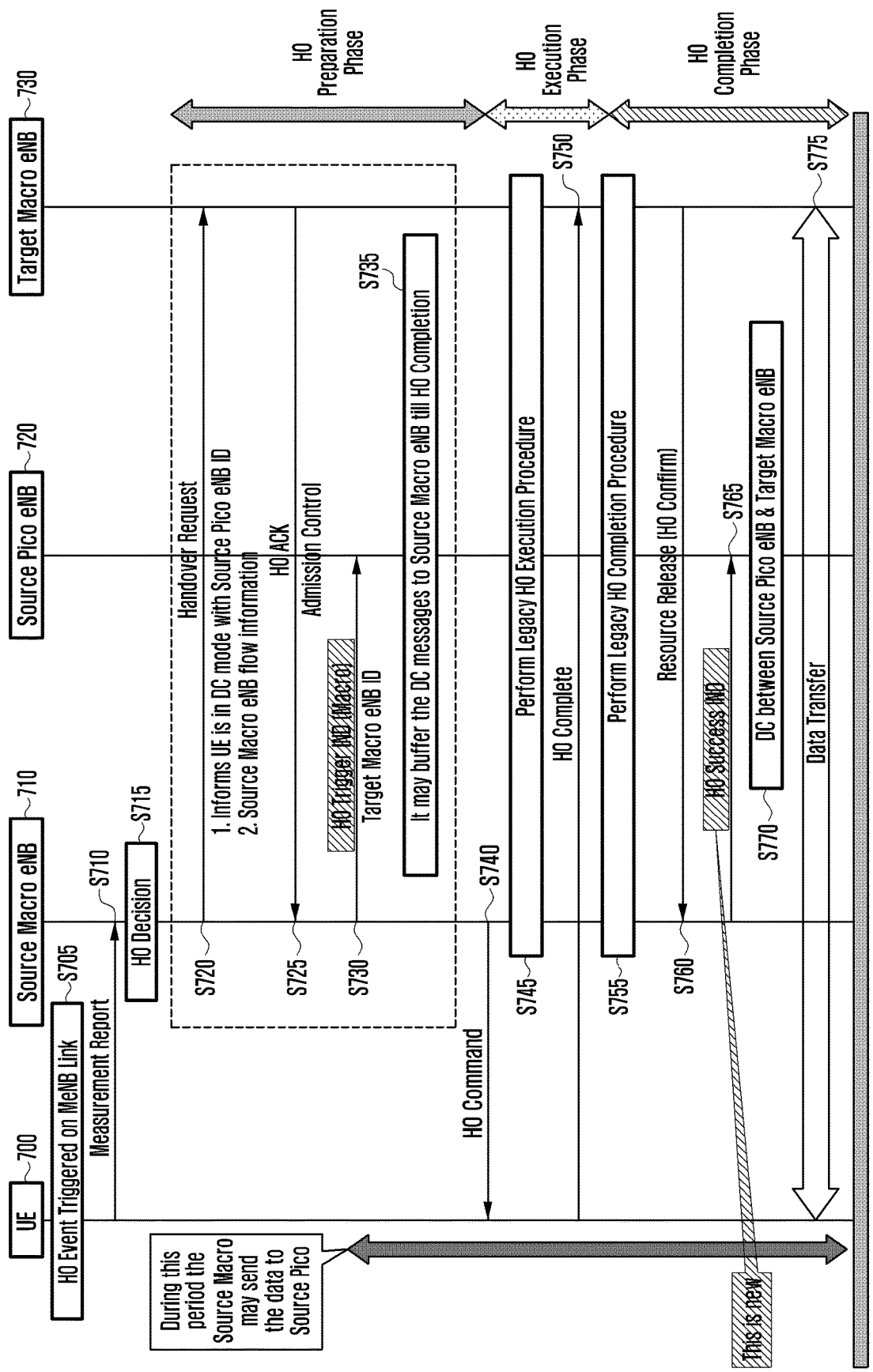
FIG. 7 is a signaling diagram illustrating a detailed operation of sequences of a macro link HO process of a CN split scenario, according to an embodiment of the present invention.

FIG. 7 is a signaling diagram illustrating a detailed operation of sequences of a macro link HO process of a CN split scenario, according to an embodiment of the present invention.

As illustrated in FIG. 7, at step S705, a UE 700 triggers an HO on a MeNB link. Accordingly, the UE 700 transmits a measurement report message to a source macro eNB 710, at step S710, and the source macro eNB 710 determines whether to perform the HO based on the measurement report, at step S715.

Further, the source macro eNB 710 transmits an HO request message to a target macro eNB 730, at step S720. The HO request message may include indication information indicating that the UE 700 is in a dual connectivity mode with a source SeNB ID and source MeNB flow information.

Then, the target macro eNB 730 transmits an HO Ack message to the source macro eNB 710, at step S725.

Then, the source macro eNB 710 transmits an HO trigger indicator (macro) to a source pies) eNB 720, at step S730. In this case, the HO trigger indicator may include an identifier of the target macro eNB 730. Then, the source pico eNB 720 may buffer a DC message to the source macro eNB 710 until the HO is completed, at step S735.

Further, the source macro eNB 710 transmits an HO command message to the UE 700, at step S740.

In addition, the source macro eNB 710 and the target macro eNB 730 may perform an HO execution process, at step S745. The HO execution process may follow the conventional HO execution process.

Further, the UE 700 may transmit an HO completion message to the target macro eNB 730, at step S750. Then, the source macro eNB 710 and the target macro eNB 730 may perform an HO completion process, at step S755. The HO completion process may follow the conventional HO completion process.

The target macro eNB 730 may transmit resource release (HO Ack) message to the source macro eNB 710, at step S760. Then, the source macro eNB 710 may transmit an HO success indicator to the source pico eNB 720, at step S765.

At step S770, dual connectivity is formed between the source pico eNB 720 and the is target macro eNB 730.

The UE 700 and the target macro eNB 730 may perform data transmission/reception, at step S775.

The above described embodiment may be summarized as follows.

HO Preparation Phase
HO request
Indicate that UE is in DC state with source pico (ID)
HO trigger IND
Source macro→source pico
Source pico buffers DC message
HO Execution Phase
Apply conventional HO process
HO completion phase
Apply conventional HO process
HO Success IND
Source macro→source pico
Source pico performs DC with target macro
HO Request
Indicate UE DC mode (together with source pico ID)
Target macro should accept DC mode
HO Trigger IND
Target macro ID
Source pico buffers DC message until HO completion
UE ID
HO Success IND
Macro layer
Source pico performs DC with target macro
UE ID Meanwhile, the embodiments disclosed in FIGS. 4-7, that is, the main characteristics of the single link HO are summarized as follows.

HO Request
information content
Indicate UE DC mode together with ID of related eNB
Flows of related eNB (except flows thereof)
   RAN split
Use
Macro HO
Source macro→target macro
Pico HO
Source macro→target pico
HO Trigger IND
Information content
Layer of HO
Target ONE ID
UE ID
Use
Macro HO
Source macro→source pico
Inform of macro HO
HO Trigger REQ
Information content
UE ID
Use
Pico HO
Source macro→source pico
   Triggers pico HO
      In different way from conventional way
HO Success END
Information content
Layer on which HO is completed
UE ID
Use
Source macro→source pico
Inform of HO completion Hereinafter, detailed embodiments of the dual link HO will be described.

Main characteristics of a dual link HO process will be first described below. The dual link HO starts from one layer as a single link HO process. In this case, the dual link HO is one part of the single link HO process, and the HO starting from one layer is displayed in another layer.

Further, completion of the HO of any one layer is displayed in another layer of which the HO is ongoing. In this case, the above matter is required to be notified to both source and target entities of another layer. The source entity should be informed through the part of the single link HO process. The target entity needs to be informed additionally.

Further, completion of the HO of another layer may be notified to a layer of which the HO has been completed. This may mean that the completion of the HO is notified to an active (target) node.

When the HO of a macro layer is first completed, the source macro may continuously control an HO process between the eNBs until the HO of a pico layer is completed.

As another characteristic, a difference between the CN split and the RAN split will be described below. In the CN split, after the HO on the pico layer is completed, flows on the pico layer may temporarily stop. Conversely, in the RAN split, after the HO on the pico layer and the HO on the macro layer are completed, flows on the pico layer may temporarily stop.

When the HO on the pico layer is being completed and the HO on the macro layer is ongoing, the source macro may process a reconfiguration of the target pico.

Hereinafter, a detailed HO process according to the type of dual link HO will be described.

First, a pico HO first start and a pico HO first end in the RAN split will be described.

According to the embodiments of the present invention, the HO of the macro eNB starts in the RAN split scenario in which the HO of the pico eNB has started, but has not yet been completed.

The macro eNB, having determined the HO, transmits an HO request, which includes information indicating that the UE is in the dual connectivity state with a source pico eNB ID, information indicating that the pico eNB HO is ongoing with the target pico eNB ID, and information on all flows, to the selected target eNB.

The target macro eNB performs an admission control and transmits an Ack to the source macro eNB. The source macro eNB transmits the indication indicating that the HO on the macro layer is ongoing with the target macro eNB ID to both the source and target pico eNBs, and transmits an HO command to the UE.

When the HO on the macro layer is ongoing and the HO on the pico layer has been completed, the target pico eNB transmits the HO Act to the source macro eNB. The source macro eNB informs the source pico eNB and the target macro eNB of the HO completion on the pico layer. Data transmission may be performed by the source macro eNB together with the target pico eNB. When the HO on the macro layer is completed, the target macro eNB transmits, to the source macro eNB, the HO Ack that informs the target pico eNB (active eNB on the pico layer) of the completion of the HO on the macro layer. Data transmission may be performed by the target macro eNB together with the target pico eNB.

The above process will be described in detail with reference to FIG. 8.

Figure 8:
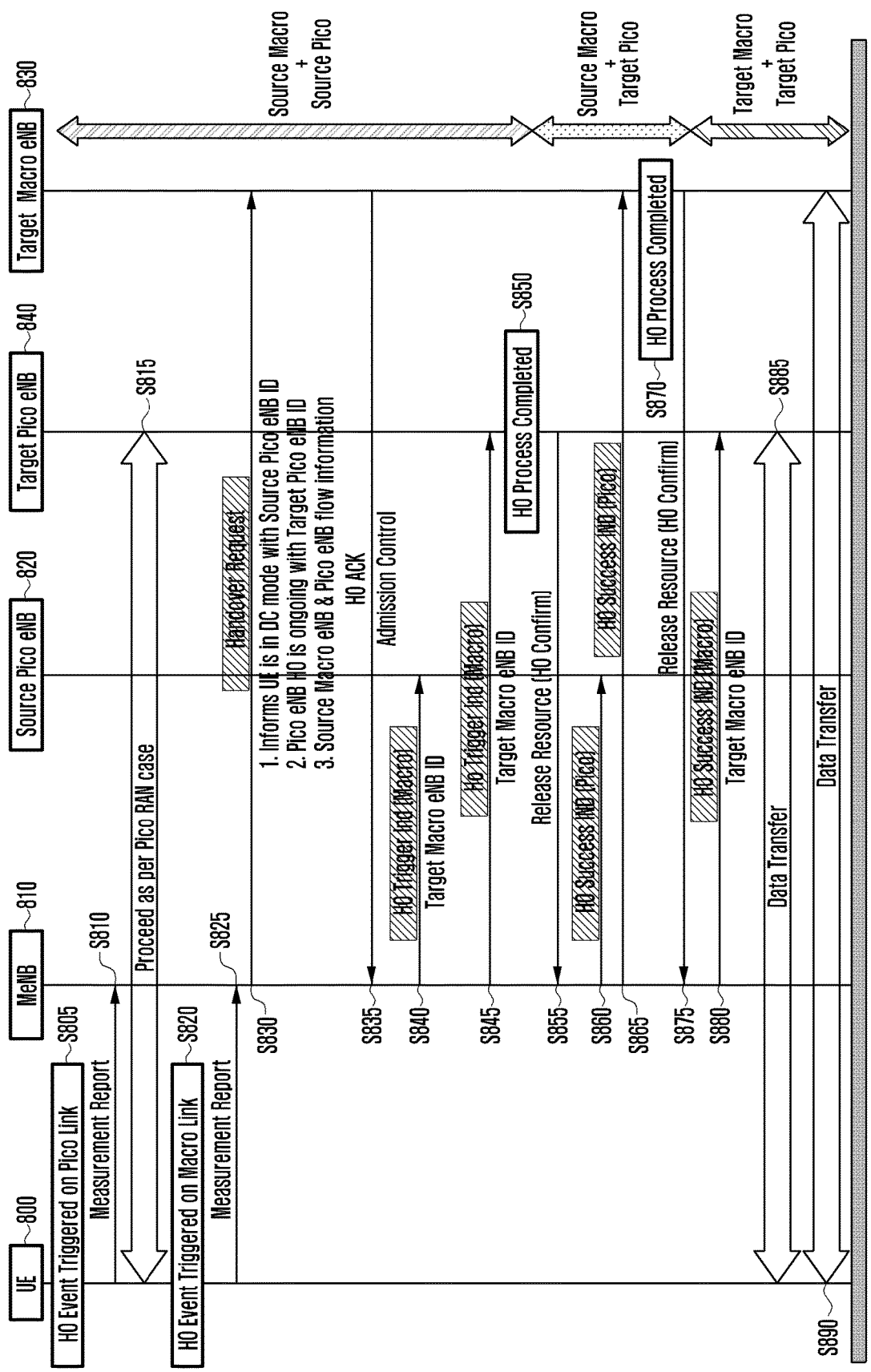
FIG. 8 is a signaling diagram it minting an HO process as it pertains to a pico HO first start and a pico HO first end in a RAN split, according to an embodiment of the present invention.

FIG. 8 is a signaling diagram illustrating a HO process as it pertains to a pico HO first start and a pico HO first end in a RAN split, according to an embodiment of the present invention.

First, a UE 800 detects triggering of an HO event on a pico link, at step S805. Then, the UE 800 transmits a measurement report to an MeNB 810, at step S810. The UE 800 and a target pico eNB 830 perform the same process as that of the RAN split pico HO, at step 815.

Thereafter, the UE 800 detects triggering of an HO event on the macro link, at step S820. Then, the UE 800 transmits the measurement report to the MeNB 810, at step S825. The MeNB 810 transmits an HO request message to a target macro eNB 830, at step S830. The HO request message may include information indicating that the UE 800 is in the dual connectivity state, an identifier of the source SeNB for dual connectivity, information indicating that the SeNB HO is ongoing, a target SeNB identifier and source MeNB and SeNB flow information.

Thereafter, the target macro eNB 830 may transmit an HO Ack message to the MeNB 810, at step S835.

Then, the MeNB 810 may transmit an HO trigger indicator (macro) to the source pico eNB 820, at step S840. The HO indicator may include the identifier of the target macro eNB 830.

Further, the MeNB 810 may transmit the HO trigger indicator (macro) to the target pico eNB 840, at step S845. The HO trigger indicator may include the identifier of the target macro eNB 830.

Then, the target pico eNB 840 completes the HO process, at step S850. The target pico eNB 840 transmits a resource release (HO Ack) message to the MeNB 810, at step S855.

Then, the MeNB 810 may transmit an HO success indicator (pico) to the source pico eNB 820, at step S860. Further, the MeNB 810 transmits the HO success indicator (pico) to the target macro eNB 840830, at step S865.

Then, the target macro eNB 830 completes the HO process, at step S870, and transmits a resource release (HO Ack) message to the MeNB 810, at step S875.

The MeNB 810 transmits an HO success indicator (macro) to the target pico eNB 840, at step S880. The HO success indicator may include identifier information on the target macro eNB 830.

Thereafter, the UE 800 and the target pico eNB 840 transmit/receive data, at step S885, and the UE 800 and the target macro eNB 830 transmit/receive data, at step S890.

Next, a pico HO lint start and a macro HO first end in the RAN split will be described.

In the above described embodiment of the present invention, after the macro eNB HO starts, the macro eNB, having determined the HO transmits an HO request, which includes information indicating that the UE is in the dual connectivity state with a source pico eNB ID, information indicating that the pico eNB HO is ongoing with the target pico eNB ID and, information on all flows, to the selected target eNB.

The target macro eNB performs an admission control and transmits Ack to the source macro eNB.

The source macro eNB transmits the indication indicating that the HO on the macro layer is ongoing with the target macro eNB ID to both the source and target pico eNBs, and transmits an HO command to the UE.

When the HO on the pico layer is ongoing and the HO on the macro layer has been completed, the target macro eNB transmits the HO Ack to the source macro eNB. The source macro eNB informs the source pico eNB and the target pico eNB of the HO completion on the macro layer.

Data transmission may be performed by the target macro eNB together with the source pico eNB.

When the HO on the pico layer is completed, the target pico eNB transmits, to the source macro eNB, the HO Ack that informs the target macro eNB and the source pico eNB of the completion of the HO on the pico layer. Data transmission may be performed by the target macro eNB together with the target pico eNB.

The above process will be described in detail with reference to FIG. 9.

Figure 9:
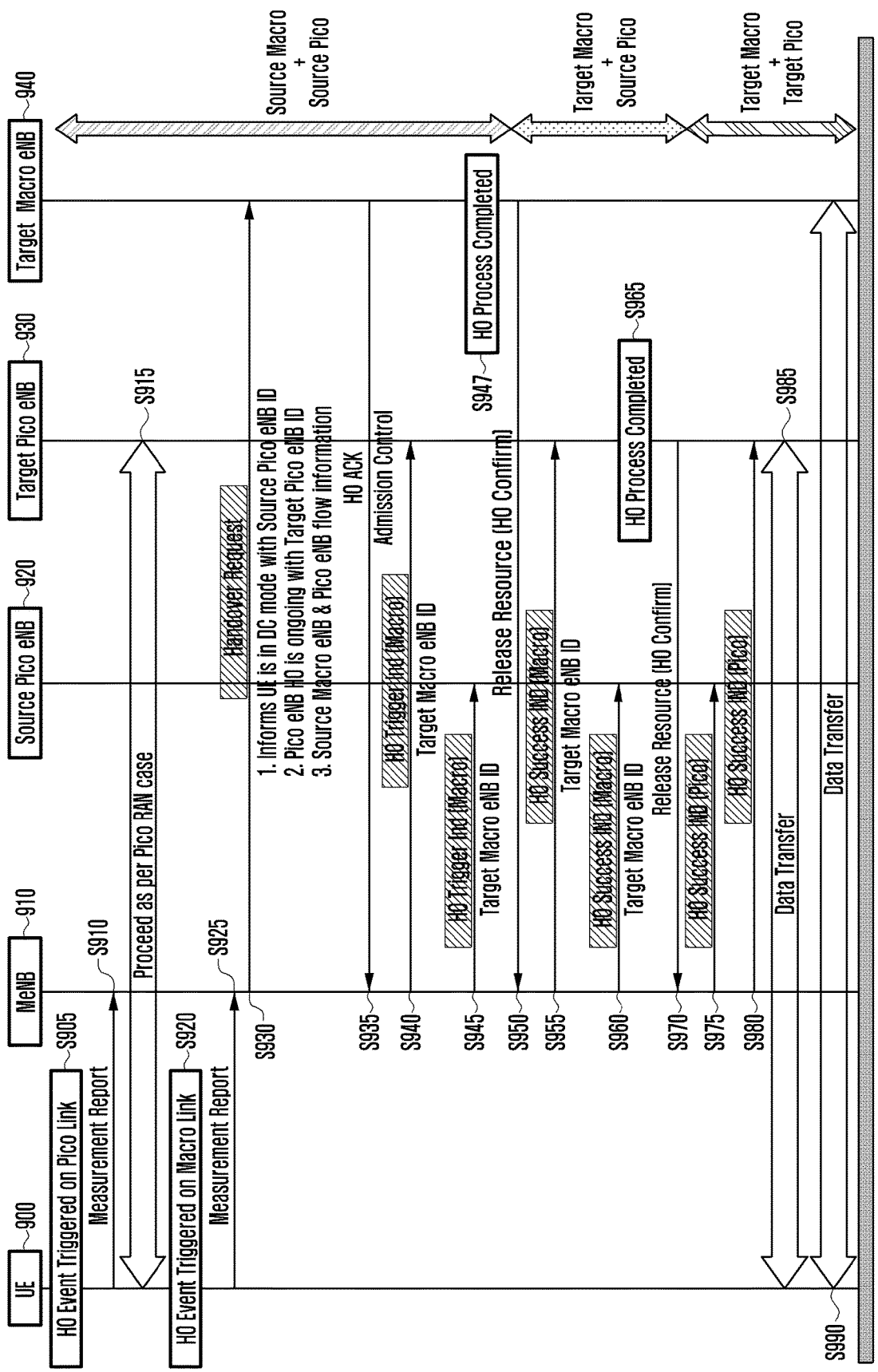
FIG. 9 is a signaling diagram illustrating an HO process as it pertains to a pico HO first start and a macro HO first end in a RAN split, according to an embodiment of the present invention.

FIG. 9 is a signaling diagram illustrating an HO process as it pertains to a pico HO first start and a macro HO first end in a RAN split, according to an embodiment of the present invention.

A UE 900 first detects triggering of an HO event on the pico link, at step S905. Then, the UE 900 transmits a measurement report to an MeNB 910, at step S910. The UE 900 and a target pico eNB 930 perform the same process as that of the RAN split pico HO.

Thereafter, the UE 900 detects triggering of an HO event on the macro link, at step S920. Then, the UE 900 transmits a measurement report to the MeNB 910, at step S925. The MeNB 910 transmits an HO request message to a target macro eNB 940, at step S930. The HO request message may include information indicating that the UE 900 is in the dual connectivity state, an identifier of the source SeNB for dual connectivity, information indicating that the SeNB HO is ongoing, a target SeNB identifier and source MeNB and SeNB flow information.

Thereafter, the target macro eNB 940 may transmit an HO Ack message to the MeNB 910, at step S935.

Then, the MeNB 910 may transmit an HO trigger indicator (macro) to the target pico eNB 930, at step S940. The HO indicator may include the identifier of the target macro eNB 940.

Further, the MeNB 810 may transmit the HO trigger indicator (macro) to the source pico eNB 920, at step S945. The HO trigger indicator may include the identifier of the target macro eNB 940.

Then, the target macro eNB 940 completes the HO process, at step S947. The target macro eNB 940 transmits a resource release (HO Ack) message to the MeNB 918, at step S950.

The MeNB 910 transmits an HO success indicator (macro) to the target pico eNB 930, at step S955. Further, the MeNB 910 transmits the HO success indicator (macro) to the source pico eNB 920, at step S960.

Then, the target pico eNB 930 completes the HO process, at step S965, and transmits a resource release (HO Ack) message to the MeNB 910, at step S970.

Then, the MeNB 910 transmits an HO success indicator (pico) to the source pico eNB 920, at step S975. Further, the MeNB 910 transmits the HO success indicator (pico) to the target macro eNB 940, at step S980.

Thereafter, the UE 900 and the target pico eNB 930 transmit/receive data, at step S985, and the UE 900 and the target macro eNB 940 transmit/receive data, at step S990.

Next, a macro HO first start and a macro HO first end in the RAN split will be described.

In the above described embodiment of the present invention, after the pico eNB HO starts, the macro eNB, having determined the HO, transmits an HO request, which includes information indicating that the UE is in the dual connectivity state with a source macro eNB ID, information indicating that the macro eNB HO is ongoing with the target macro eNB ID, and information on all flows of the source pico eNB and the UE, to the selected target pico eNB.

The target pico eNB performs an admission control and transmits an Ack to the source macro eNB.

The source macro eNB transmits a request for transmitting data to the source pico eNB and transmits an HO command to the UE.

When the HO on the pico layer is ongoing and the HO on the macro layer has been completed, the target macro eNB transmits the HO Ack to the source macro eNB. The source macro eNB informs the source pico eNB and the target pico eNB of the HO completion on the macro layer.

Data transmission may be performed by the target macro eNB together with the source pico eNB. When the HO on the pico layer is completed, the target pico eNB transmits, to the source macro eNB, the HO Ack that informs the target macro eNB and the source pico eNB of the completion of the HO on the pico layer.

Data transmission may be performed by the target macro eNB together with, the target pico eNB.

The above process will be described in detail with reference to FIG. 10.

Figure 10:
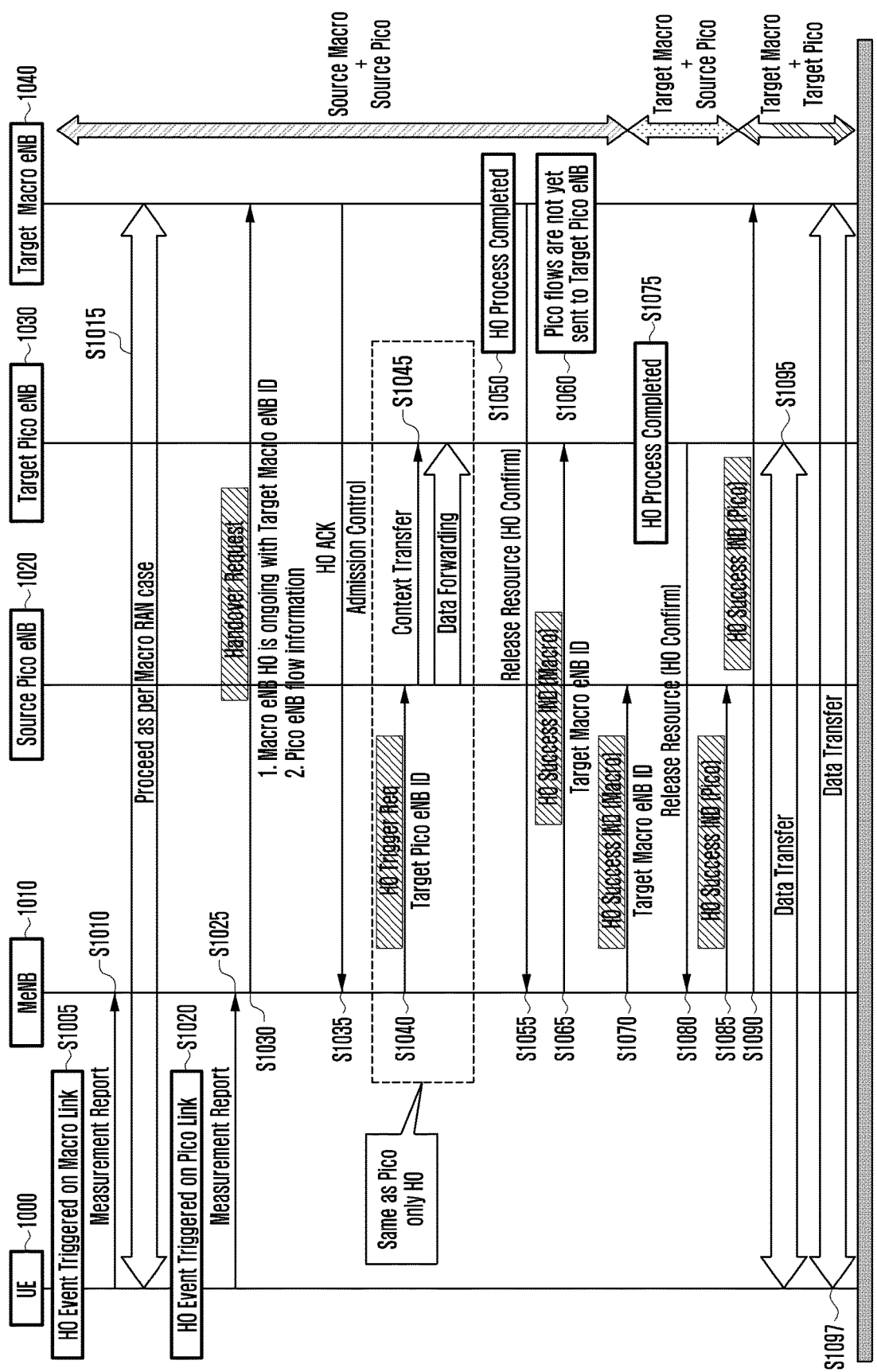
FIG. 10 is a signaling diagram illustrating an HO process as it pertains to a macro HO first start and a macro HO first end in a RAN split, according to an embodiment of the present invention.

FIG. 10 is a signaling diagram illustrating an HO process as it pertains to a macro HO first start and a macro HO first end in a RAN split, according to an embodiment of the present invention.

A UE 1000 first detects triggering of an HO event on the macro link, at step S1005. Then, the UE 1000 transmits a measurement report to an MeNB 1010, at step S1010. The UE 1000 and a target macro eNB 1040 perform the same process as that of the RAN split macro HO.

Thereafter, the UE 1000 detects triggering of an HO event on the pico link, at step S1020. Then, the UE 1000 transmits a measurement report to the MeNB 1010, at step S1025. The MeNB 1010 transmits an HO request message to a target pico eNB 1030, at step S1030. The HO request message may include information indicating that the MeNB 1010 HO is ongoing and identification information of the target eNB is a MeNB ID, and information on SeNB flows.

Thereafter, the target SeNB 1030 may transmit an HO Ack message to the MeNB 1010, at step S1035.

Then, the MeNB 1010 may transmit an HO trigger request message to a source pico eNB 1020, at step S1040. The HO trigger request message may include an identifier of the target pico eNB 1030.

Then, the source pico eNB 1020 transmits UE context information and forwards data to the target pico SeNB 1030, at step S1045.

In step S1050, the target macro eNB 1040 completes the HO process. Then, the target macro eNB 1040 transmits a resource release message (HO completion) to the MeNB 1010, at step S1055. As illustrated at step S1060, pico flows have not yet been sent to the target pico eNB 1030.

The MeNB 1010 transmits an HO success indicator (macro) to the target pico eNB 1030, at step S1065. The HO success indicator may include identification information on the target macro eNB 1040.

Further, the MeNB 1010 transmits the HO success indicator (macro) to the target pico eNB 1030, at step S1070. The HO success indicator may include identification information on the target macro eNB 1040.

The target pico eNB 1030 completes the HO process. Then, the target pico eNB 1030 transmits a resource release message (HO completion) to the MeNB 1010, at step S1080. The MeNB 1010 transmits an HO success indicator (pico) to the source pico eNB 1020, at step S1085, and subsequently transmits the HO success indicator (pico) to the target macro eNB 1040, at step S1090.

Thereafter, the UE 1000 transmits/receives data to/from the target pico eNB 1030, at step S1095, and transmits/receives data to/from the target macro eNB 1040, at step S1097.

Next, a macro HO first start and a pico HO first end in the RAN split will be described.

In the above described embodiment of the present invention, after the pico eNB HO starts, the macro eNB, having determined the HO, transmits an HO request which includes information indicating that the UE is in the dual connectivity state with a source macro eNB ID, information indicating that the macro eNB HO is ongoing with the target macro eNB ID, and information on all flows of the spume pico eNB and the UE, to the selected target pico eNB.

The target pico eNB performs an admission control and transmits an Ack to the source macro eNB. The source macro eNB transmits a request for transmitting data to the source pico eNB and transmits an HO command to the UE. When the HO on the macro layer is ongoing and the HO on the pico layer has been completed, the target pico eNB transmits the HO Ack to the source macro eNB.

The source macro eNB informs the source pico eNB and the target macro eNB of the HO completion on the pico layer. Data transmission may be performed by the source macro eNB together with the target pico eNB.

When the HO on the macro layer is completed, the target macro eNB transmits, to the source macro eNB, the HO Ack that informs the target pico eNB of the completion of the HO on the macro layer. Data transmission may be performed by the target macro eNB together with the target pico eNB.

The above embodiment will be described in detail with reference to FIG. 11.

Figure 11:
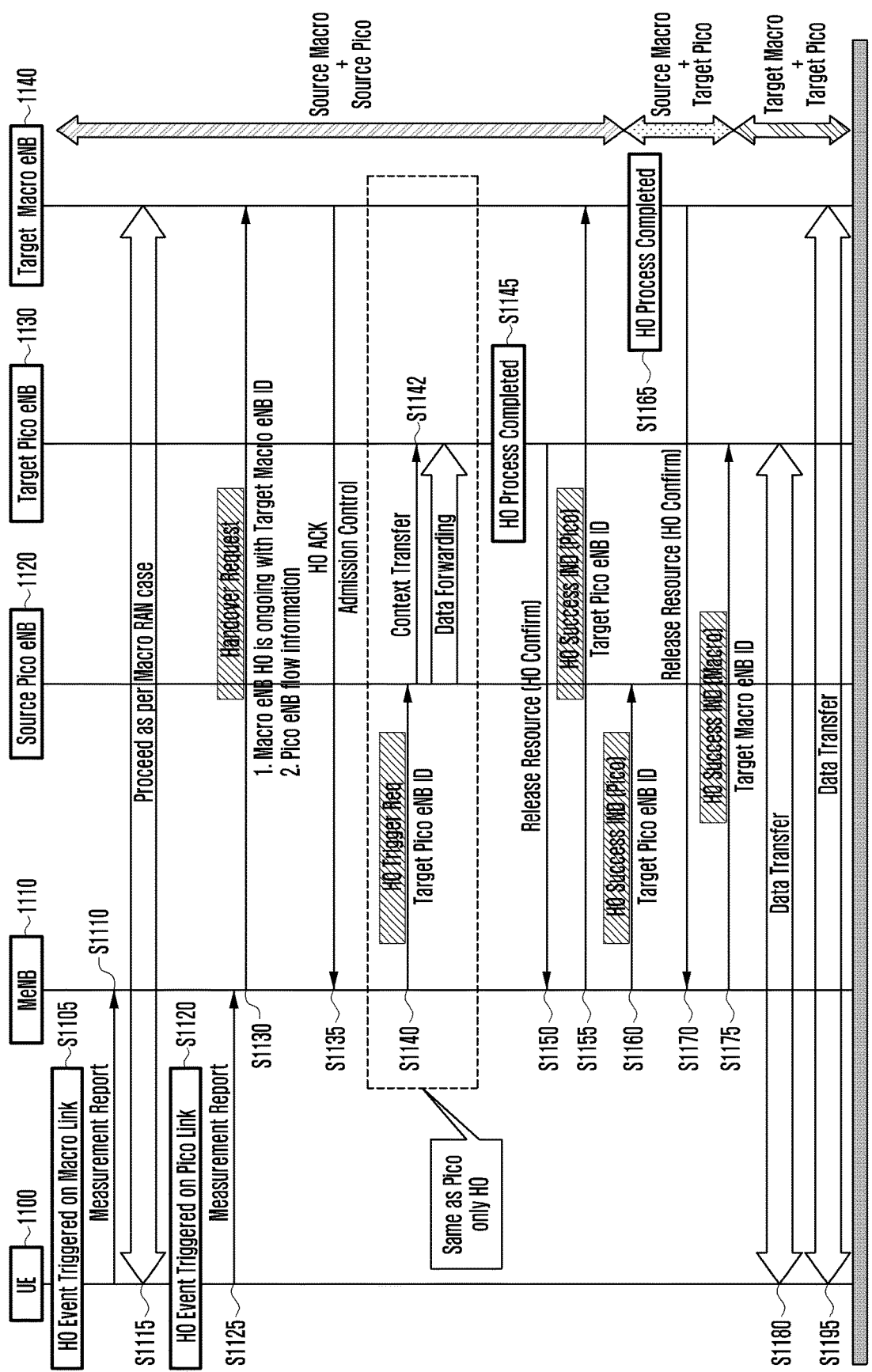
FIG. 11 is a signaling diagram illustrating an HO process as it pertains to a macro HO first start and a pico HO first end in a RAN split, according to an embodiment of the present invention.

FIG. 11 is a signaling diagram illustrating an HO process as it pertains to a macro HO first start and a pico HO first end in a RAN split, according to an embodiment of the present invention.

A UE 1100 first detects triggering of an HO event on the macro link, at step S1105. Then, the UE 1100 transmits a measurement report to an MeNB 1110, at step S1110. The UE 1100 and a target macro eNB 1140 perform the same process as that of the RAN split macro HO.

Thereafter, the UE 1100 detects triggering of an HO event on the pico link, at step S1120. Then, the UE 1100 transmits a measurement report to the MeNB 1110, at step S1125. The MeNB 1110 transmits an HO request message to a target pico eNB 1130, at step S1130. The HO request message may include information indicating that the MeNB 1110 handover is ongoing, identification information of the target eNB is an MeNB ID, and information on SeNB flows.

Thereafter, the target pico eNB 1130 may transmit an HO Ack message to the MeNB 1110, at step S1135.

Then, the MeNB 1110 may transmit an HO trigger request message to a source pico eNB 1120, at step S1140. The HO trigger request message may include an identifier of the target pico eNB 1130.

Then, the source pico eNB 1120 transmits UE 1100 context information and forwards data to the target pico eNB 1130, at step S1142.

At step S1145, the target pico eNB 1130 completes the HO process. Then, the target macro eNB 1140 transmits a resource release message (HO completion) to the MeNB 1110, at step S1150.

The MeNB 1110 transmits an HO success indicator (pico) to the target macro eNB 1140, at step S1155. The HO success indicator may include identification information on the target pico eNB 1130.

Further, the MeNB 1110 transmits an HO success indicator (pico) to the source pico eNB 1120, at step S1160. The HO success indicator may include identification information on the target pico eNB 1130.

At step S1165, the target macro eNB 1140 completes the HO process. Then, the target macro eNB 1140 transmits a resource release message (HO completion) to the MeNB a 1110, at step S1170. The MeNB 1110 transmits an HO success indicator (macro) to the target pico eNB 1130, at step S1175.

Thereafter, the UE 1100 transmits/receives data to/from the target pico eNB 1130, at step S1180, and transmits/receives data to/from the target macro eNB 1140, at step S1195.

Next, a pico HO First start and a pico HO first end in the CN split will be described.

In the above described embodiment of the present invention, after the macro eNB HO starts, the macro eNB, having determined the HO, transmits an HO request, which includes information indicating that the UE is in the dual connectivity state with a source pico eNB ID, information indicating that the pico eNB HO is ongoing with a target pico eNB ID, and information on all flows, to the selected target macro eNB.

The target macro eNB performs an admission control and transmits an Ack to the source macro eNB. The source macro eNB transmits the indication indicating that the HO on the macro layer is ongoing with the target macro eNB ID to both the source and target pico eNBs, and transmits an HO command to the UE.

When the HO on the macro layer is ongoing and the HO on the pico layer has been completed, the target pico eNB transmits the HO Ack to the source macro eNB. The source macro eNB informs the source pico eNB and the target macro eNB of the HO completion on the pico layer. Data transmission may be performed by the source macro eNB together with the target pico eNB.

When the HO on the macro layer is completed, the target macro eNB transmits, to the source macro eNB, the HO Ack that informs the target pico eNB (active eNB on the pico layer) of the completion of the HO on the macro layer. Data transmission may be performed by the target macro eNB together with the target pico eNB.

The above embodiment will be described in more detail with reference to FIG. 12.

Figure 12:
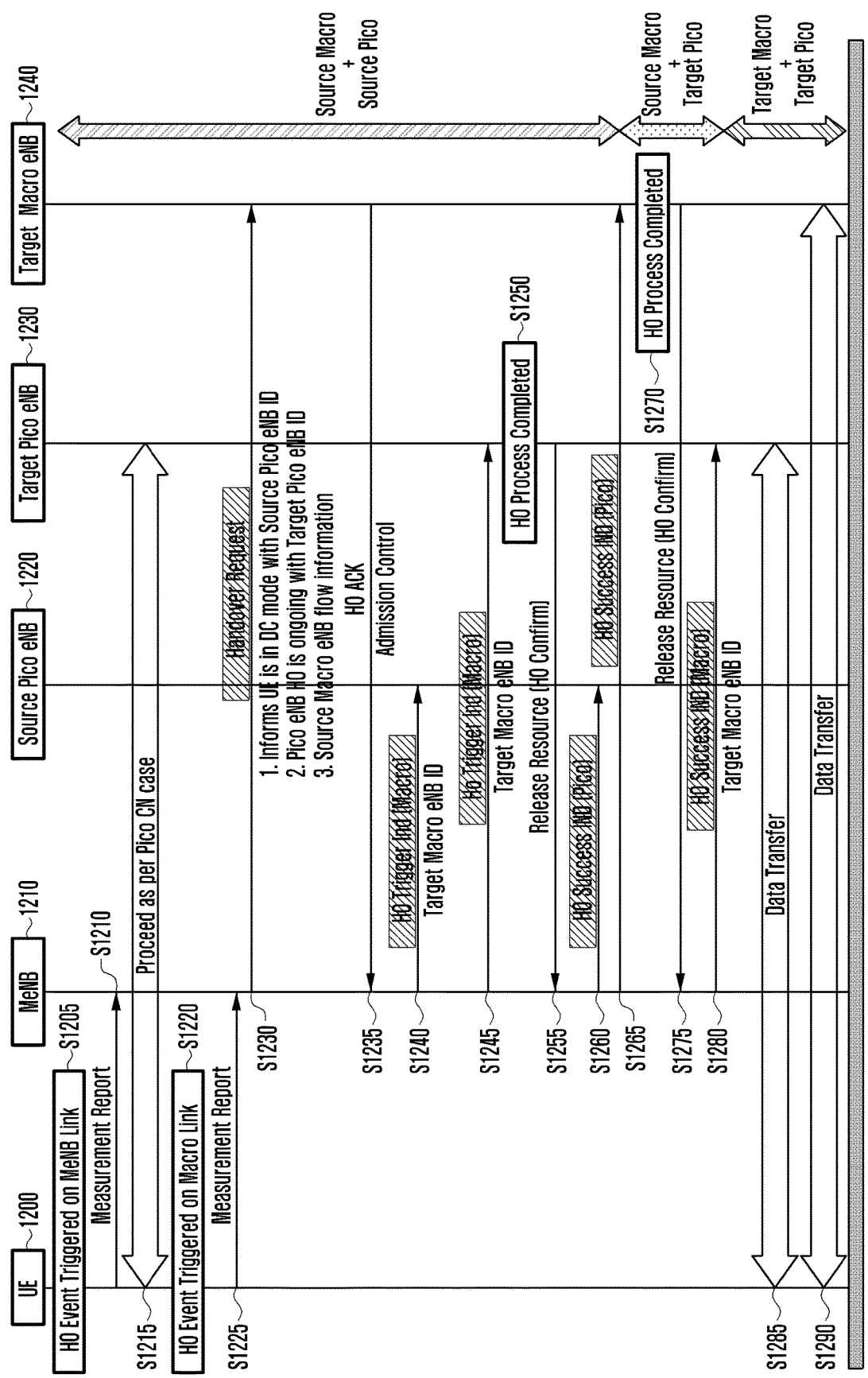
FIG. 12 is a signaling diagram illustrating an HO process as it pertains to a pico HO first start and a pico HO first end in a CN split, according to an embodiment of the present invention.

FIG. 12 is a signaling diagram illustrating an HO process as it pertains to a pico HO a first start and a pico HO first end in a CN split, according to an embodiment of the present invention.

A UE 1200 first detects triggering of an HO event on the pico link, at step S1205. Then, the UE 1200 transmits a measurement report to an MeNB 1210, at step S1210. The UE 1200 and a target pico eNB 1230 perform the same process as that of the CN split pico HO.

Thereafter, the UE 1200 detects triggering of an HO event on the macro link, at step S1220. Then, the UE 1200 transmits a measurement report to the MeNB 1210, at step S1225. The MeNB 1210 transmits an HO request message to a target macro MeNB 1240, at step S1230. The HO request message may include information indicating that the UE 1200 is in the dual connectivity mode, information indicating that the UE 1200 is being connected to a source SeNB ID, information indicating that the SeNB HO is ongoing, identification information of the target eNB is an SeNB ID, and information on MeNB 1220 flows.

Thereafter, the target macro eNB 1240 may transmit an HO Ack message to the MeNB 1210, at step S1235.

Then, the MeNB 1210 may transmit an HO trigger indicator (macro) to a source pico eNB 1220, at step S1240. The HO trigger request message may include an identifier of the target macro eNB 1240.

Further, the MeNB 1210 may transmit the HO trigger indicator (macro) to the target pico eNB 1230, at step S1245. The HO trigger request message may include an identifier of the target macro eNB 1240.

At step S1250, the target pico eNB 1230 completes the HO process. Then, the target pico eNB 1230 transmits a resource release message (HO completion) to the MeNB 1210, at step S1255.

The MeNB 1210 transmits an HO success indicator (pico) to the source pico eNB 1220, at step S1260. Further, the MeNB 1210 transmits the HO success indicator (pico) to the target macro eNB 1240, at step S1265.

At step S1270, the target macro eNB 1240 completes the HO process. Then, the target macro eNB 1240 transmits a resource release message (HO completion) to the MeNB 1210, at step S1275. The MeNB 1210 transmits an HO success indicator (macro) to the target pico eNB 1230, at step S1280. The HO success indicator may include identification information on the target macro eNB 1240.

Thereafter, the UE 1200 transmits/receives data to/from the target pico eNB 1230, at step S1285, and transmits/receives data to/from the target macro eNB 1240, at step S1290.

Next, a pico HO first start and a macro HO first end in the CN split will be described.

In the above described embodiment of the present invention, after the macro eNB HO starts, the macro eNB, having determined the HO, transmits an HO request, which includes information indicating that the UE is in the dual connectivity state with a source pico eNB ID, information indicating that the pico eNB HO is ongoing with a target pico eNB ID, and information on all flows, to the selected target macro eNB.

The target macro eNB performs an admission control and transmits an Ack to the source macro eNB. The source macro eNB transmits the indication indicating that the HO on the macro layer is ongoing with the target macro eNB ID to both the source and target pico eNBs, and transmits an HO command to the UE.

When the HO on the pico layer is ongoing and the HO on the macro layer has been completed, the target macro eNB transmits the HO Ack to the source macro eNB. The source macro eNB informs the source pico eNB and the target pico eNB of the HO completion on the macro layer. Data transmission may be performed by the target macro eNB together with the source pico eNB.

When the HO on the pico layer is completed, the target pico eNB transmits, to the source macro eNB, the HO Ack that informs the target macro eNB and the some pico eNB of the completion of the HO on the pico layer. Data transmission may be performed by the target macro eNB together with the target pico eNB.

The above process will be described in detail with reference to FIG. 13.

Figure 13:
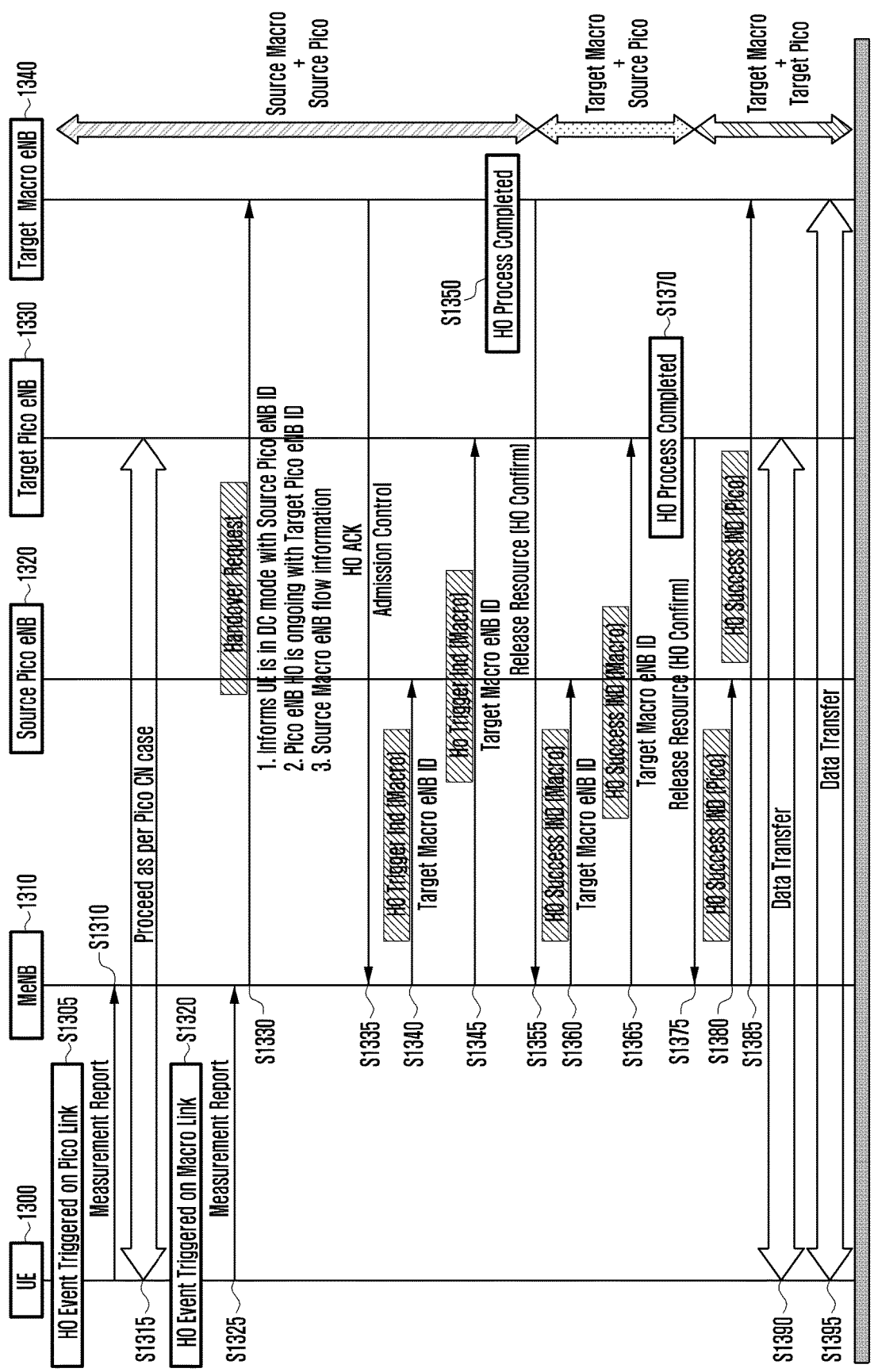
FIG. 13 is a signaling diagram illustrating an HO process as it pertains to a pico HO first start and a macro HO first end in a CM split, according to an embodiment of the present invention.

FIG. 13 is a signaling diagram illustrating, an HO process as it pertains to a pico HO first start and a macro HO first end in a CN split, according to an embodiment of the present invention.

A UE 1300 first detects triggering of an HO event on the pico link, at step S1305. Then, the UE 1300 transmits a measurement report to an MeNB 1310, at step S1310. The UE 1300 and a target pico eNB 1330 perform the same process as that of the CN split pico HO.

Thereafter, the UE 1300 detects triggering of an HO event on the macro link, at step S1320. Then, the UE 1300 transmits a measurement report to the MeNB 1310, at step S1325. The MeNB 1310 transmits an HO request message to a target macro eNB 1340, at step S1330. The HO request message may include information indicating that the UE is in the dual connectivity mode and is being connected to a source SeNB ID, and information indicating that the SeNB HO is ongoing and identification information of the target eNB is an SeNB ID, and information on the MeNB 1310 flows.

Thereafter, the target MeNB 1340 may transmit an HO Ack message to the MeNB 1310, at step S1335.

Then, the MeNB 1310 may transmit an HO trigger indicator (macro) to a source pico eNB 1320, at step S1340. The HO trigger request message may include an identifier of the target macro eNB 1340.

Further, the MeNB 1310 may transmit the HO trigger indicator (macro) to the target pico eNB 1330, at step S1345. The HO trigger request message may include an identifier of the target macro eNB 1340.

At step S1050, the target macro eNB 1340 completes the HO process. Then, the target macro eNB 1340 transmits a resource release message (HO completion) to the MeNB 1310, at step S1355.

The MeNB 1310 transmits an HO success indicator (macro) to the source pico eNB 1320, at step S1360. The MeNB 1310 transmits an HO success indicator (macro) to the target macro eNB 1340, at step S1365.

At step S1370, the target pico eNB 1330 completes the HO process. Then, the target pico eNB 1330 transmits a resource release message (HO completion) to the MeNB 1310, at step S1375.

Then, the MeNB 1310 transmits an HO success indicator (pico) to the source pico eNB 1320, at step S1380. Further, the MeNB 1310 transmits the HO success indicator (pico) to the target macro eNB 1340, at step S1385.

Thereafter, the UE 1300 transmits/receives data to/from the target pico eNB 1330, at step S1390, and transmits/receives data to/from the target macro eNB 1340, at step S1395.

Next, a macro HO first start and a macro HO first end in the CN split will be described.

In the above described embodiment of the present invention, after the pico eNB HO starts, the macro eNB, having determined the HO, transmits an HO request, which includes information indicating that the UE is in the dual connectivity state with a source macro eNB ID, information indicating that the macro eNB HO is ongoing with the target macro eNB ID, and information on all flows of the source pico eNB and the UE, to the selected target pico eNB.

The target pico eNB performs an admission control and transmits an Ack to the source macro eNB. The source macro eNB transmits a request for transmitting data to the source pico eNB and transmits an HO command to the UE.

When the HO on the pico layer is ongoing and the HO on the macro layer has been completed, the target macro eNB transmits the HO Ack to the source macro eNB. The source macro eNB informs the source pico eNB and the target pico eNB of the HO in completion on the macro layer. Data transmission may be performed by the target macro eNB together with the source pico eNB.

When the HO on the pico layer is completed, the target pico eNB transmits, to the source macro eNB, the HO Ack that informs the target macro eNB and the source pico eNB of the completion of the HO on the pico layer. Data transmission may be performed by the target macro eNB together with the target pico eNB.

The above process will be described in detail with reference to FIG. 14.

Figure 14:
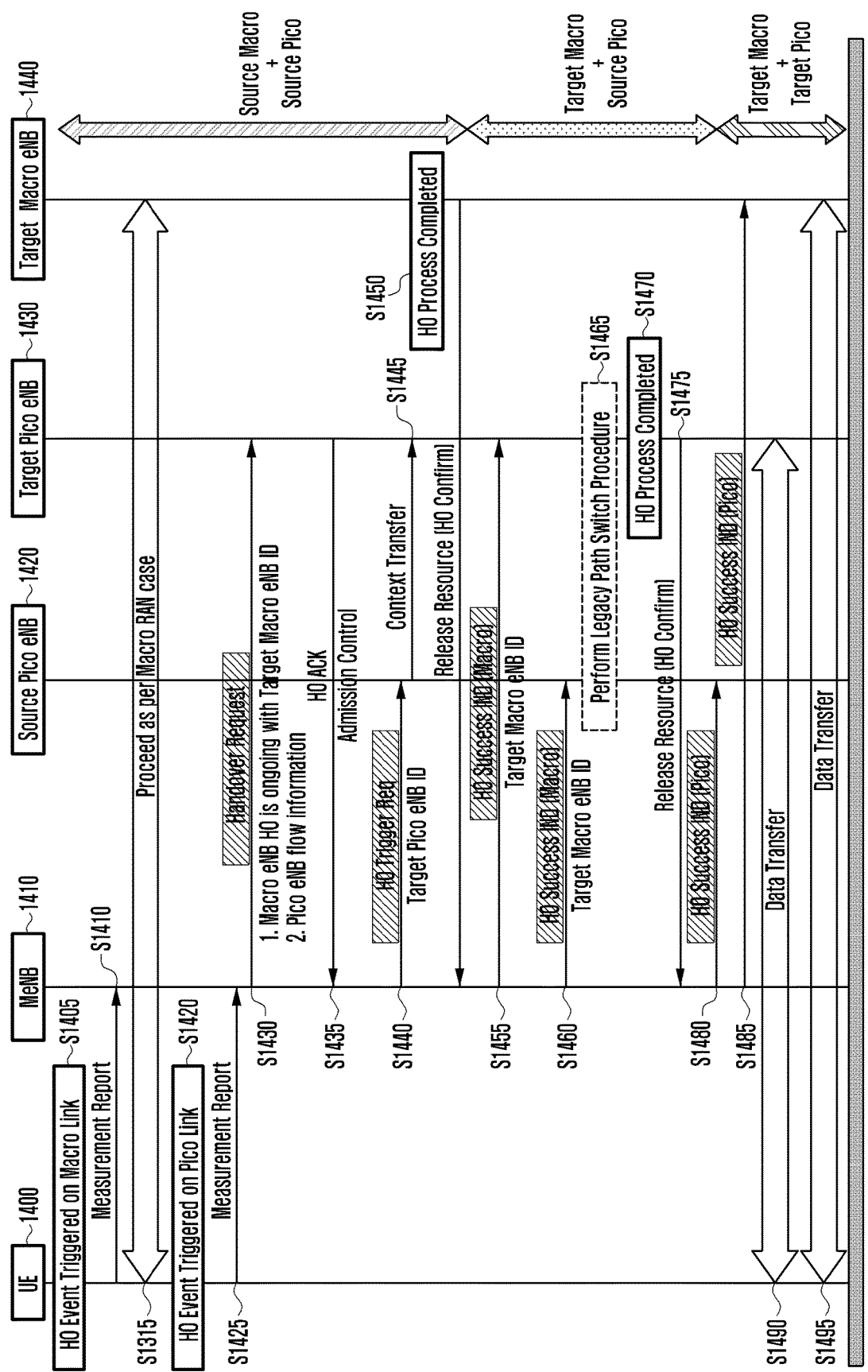
FIG. 14 is a signaling diagram illustrating an HO process as it pertains to a macro HO first start and a macro HO first end in a CN split, according to an embodiment of the present invention.

FIG. 14 is a signaling diagram illustrating an HO process as it pertains to a macro HO first start and a macro HO first end in a CN split, according to an embodiment of the present invention.

A UE 1400 first detects triggering of an HO event on the macro link, at step S1405. Then, the UE 1400 transmits a measurement report to an MeNB 1410, at step S1410. The UE 1400 and a target macro eNB 1440 perform the same process as that of the RAN split macro HO.

Thereafter, the UE 1400 detects triggering of an HO event on the pico link, at step S1420. Then, the UE 1400 transmits a measurement report to the MeNB 1410, at step S1425. The MeNB 1410 transmits an HO request message to a target pico eNB 1430, at step S1430. The HO request message may include information indicating that the MeNB 1410 HO is ongoing and identification information of the target eNB is a MeNB ID, and information on SeNB flows.

Thereafter, the target pico eNB 1430 may transmit an HO Ack message to the MeNB 1410, at step S1435.

Then, the MeNB 1410 may transmit an HO trigger request message to a source pico eNB 1420, at step S1440. The HO trigger request message may include an identifier of the target pico eNB 1430.

Then, the source pico eNB 1420 transmits the UE 1400 context information to the target pico eNB 1430, at step S1445.

At step S1450, the target macro eNB 1440 completes the HO process. Then, the target macro eNB 1440 transmits a resource release message (HO completion) to the MeNB 1410, at step S1455.

The MeNB 1410 transmits an HO success indicator (macro) to the target pico eNB 1430, at step S1455. The HO success indicator may include identification information on the target macro eNB 1440.

Further, the MeNB 1410 transmits the HO success indicator (macro) to the source pico eNB 1420, at step S1460. The HO success indicator may include identification information on the target macro eNB 1440. Then, the source pico eNB 1420 may perform a conventional path switch process, at step S1465.

At step S1470, the target pico eNB 1430 completes the HO process. Then, the target pico eNB 1430 transmits a resource release message (HO completion) to the MeNB 1410, at step S1475. The MeNB 1410 transmits an HO success indicator (pico) to the source pico eNB 1420, at step S1450, and subsequently transmits the HO success indicator (pico) to the target macro eNB 1440, at step S1485.

Thereafter, the UE 1400 transmits/receives data to/from the target pico eNB 1430, at step S1490, and transmits/receives data to/from the target macro eNB 1440, at step S1495.

Next, a macro HO first start and a pico HO first end in the CN split will be described.

In the above described embodiment of the present invention, after the pico eNB starts, the macro eNB, having determined the HO, transmits an HO request, which includes information indicating that the UE is in the dual connectivity state with a source macro eNB ID, information indicating that the macro eNB HO is ongoing with the target macro eNB ID, and information on all flows of the source pico eNB and the UE, to the selected target pico eNB.

The target pico eNB performs an admission control and transmits an Ack to the source macro eNB. The source macro eNB transmits a request for transmitting data to the source pico eNB and transmits an HO command to the UE. When the HO on the macro layer is ongoing and the HO on the pico layer has been completed, the target pico eNB transmits the HO Ack to the source macro eNB.

The source macro eNB informs the source pico eNB and the target macro eNB of the HO completion on the pico layer. Data transmission may be performed by the source macro eNB together with the target pico eNB.

When the HO on the macro layer is completed, the target macro eNB transmits, to the source macro eNB, the HO Ack that informs the target pico eNB of the completion of the HO on the macro layer. Data transmission may be performed by the target macro eNB together with the target pico eNB.

The above process will be described in detail with reference to FIG. 15.

Figure 15:
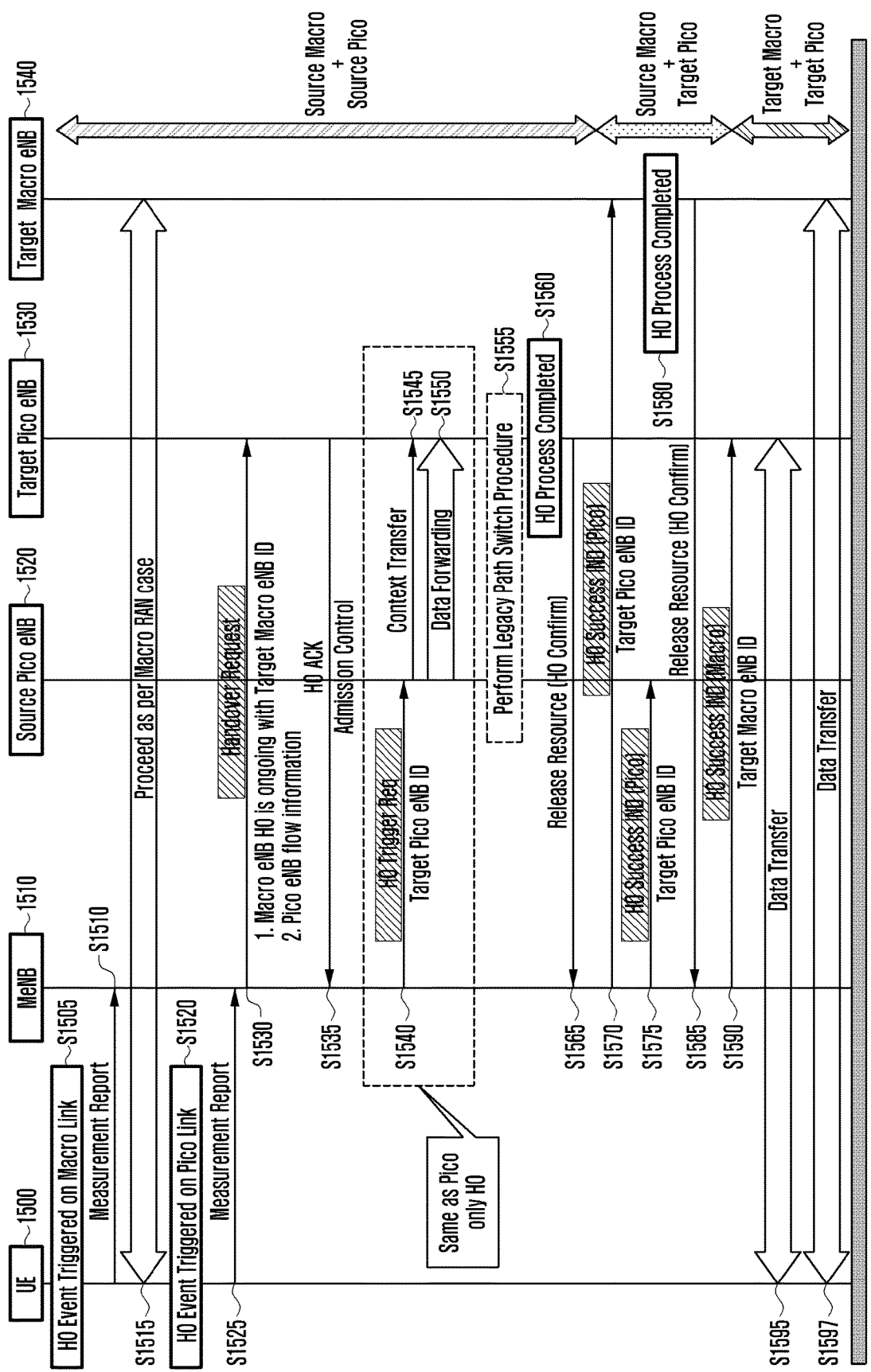
FIG. 15 is a signaling diagram illustrating an HO process as it pertains to a macro HO first start and a pico HO first end in a CN split, according to an embodiment of the present invention.

FIG. 15 is a signaling diagram illustrating an HO process as it pertains to a macro HO first start and a pico HO first end in a CN split, according to an embodiment of the present invention.

A UE 1500 first detects triggering of an HO event on the macro link, at step S1505. Then, the UE 1500 transmits a measurement report to an MeNB 1510, at step S1510. The UE 1500 and a target macro eNB 1540 perform the same process as that of the RAN split macro HO.

Thereafter, the UE 1500 detects triggering of an HO event on the pico link, at step S1520. Then, the UE 1500 transmits a measurement report to the MeNB 1510, at step S1525. The MeNB 1510 transmits an HO request message to a target pico eNB 1530, at step S1530. The HO request message may include information indicating that the MeNB 1510 HO is ongoing and identification information of the target eNB is an MeNB ID, and information on SeNB flows.

Thereafter, the target pico eNB 1530 may transmit an HO Ack message to the MeNB 1510, at step S1535.

Then, the MeNB 1510 may transmit an HO trigger request message to a source pico eNB 1520, at step S1540. The HO trigger request message may include an identifier of the target SeNB.

Then, the source SeNB 1520 transmits the UE 1500 context information to the target pico eNB 1530, at step S1545. Further, the source pico eNB 1520 forwards data to the target pico eNB 1530, at step S1550.

Thereafter, a conventional path switch process may be performed between the source pico eNB 1520 and the target pico eNB 1530, at step 1555.

At step S1560, the target pico eNB 1530 completes the HO process. Then, the target pico eNB 1530 transmits a resume release message (HO completion) to the MeNB 1510, at step S1565.

The MeNB 1510 transmits an HO success indicator (pico) to the target macro eNB 1540, at step S1570. The HO success indicator may include identification information on the target pico eNB 1530.

Further, the MeNB 1510 transmits the HO success indicator (pico) to the source pico eNB 1520, at step S1575. The HO success indicator may include identification information on the target pico eNB 1530.

At step S1580, the target macro eNB 1540 completes the HO process. Then, the target macro eNB 1540 transmits a resource release message (HO completion) to the MeNB 1510, at step S1585. The MeNB 1510 transmits an HO success indicator (macro) to the is target pico eNB 1530, at step S1590. The HO success indicator may include an identifier of the target macro eNB 1540.

Thereafter, the UE 1500 transmits/receives data to/from the target pico eNB 1530, at step S1595, and transmits/receives data to/from the target macro eNB 1540, at step S1597.

Common characteristics of the dual link hand over described in FIGS. 8-15 are summarized as follows.
HO request
Information content
Indicate UE DC mode together with related eNB ID
Flows of related eNB (except for flows thereof)
  RAN split
Layer on which HO is ongoing
Target BID (base station ID) of layer on which HO is ongoing
Use
Macro HO
  Source macro→target macro
Pico HO
  Source macro→target pico
HO Trigger IND
Information content
Layer of HO
Target eNB ID
UE ID
Use
Macro HO
  Source macro→source pico
  Source macro→target pico
    When macro HO is triggered while pico HO is ongoing
HO Trigger REQ
Information content
UE ID
Use
Pico HO
  Source macro→source pico
    Trigger pico HO
      In different way from conventional way
HO Success IND
Information content
Layer on which HO is completed
UE ID
Use
Source macro→source pico
Source macro→target pico
  When pico HO is ongoing while macro HO ends
Source macro→target macro
  When macro HO is ongoing while pico HO ends Meanwhile, according to another embodiment of the present invention, the pico link HO process in the CN split scenario may be taken into account as follows.

When the macro eNB determines the HO and then the HO of the pico eNB in the dual connectivity state is performed, the macro eNB transmits an HO command for triggering an HO process for the pico layer to the source pico eNB.

When receiving the trigger from the macro eNB, the source pico eNB transmits an HO request including information indicating that the UE is in the dual connectivity state with a related macro eNB ID to the target pico eNB.

The target pico eNB performs an admission control and transmits an Ack to the source pico eNB. The source pico eNB informs the macro eNB of a result of the admission control by the target pico eNB. When result of the admission control is positive, the macro eNB transmits an HO command to the UE. The source pico eNB and the target pico eNB continuously perform the conventional HO execution and completion processes. When the target pico eNB transmits the HO Ack to the source pico eNB, the source pico eNB notifies the completion of the HO on the pico layer to the macro eNB. Data transmission is performed by the target pico eNB together with the macro eNB providing the UE through dual connectivity.

The above process will be described in detail with reference to FIG. 16.

Figure 16:
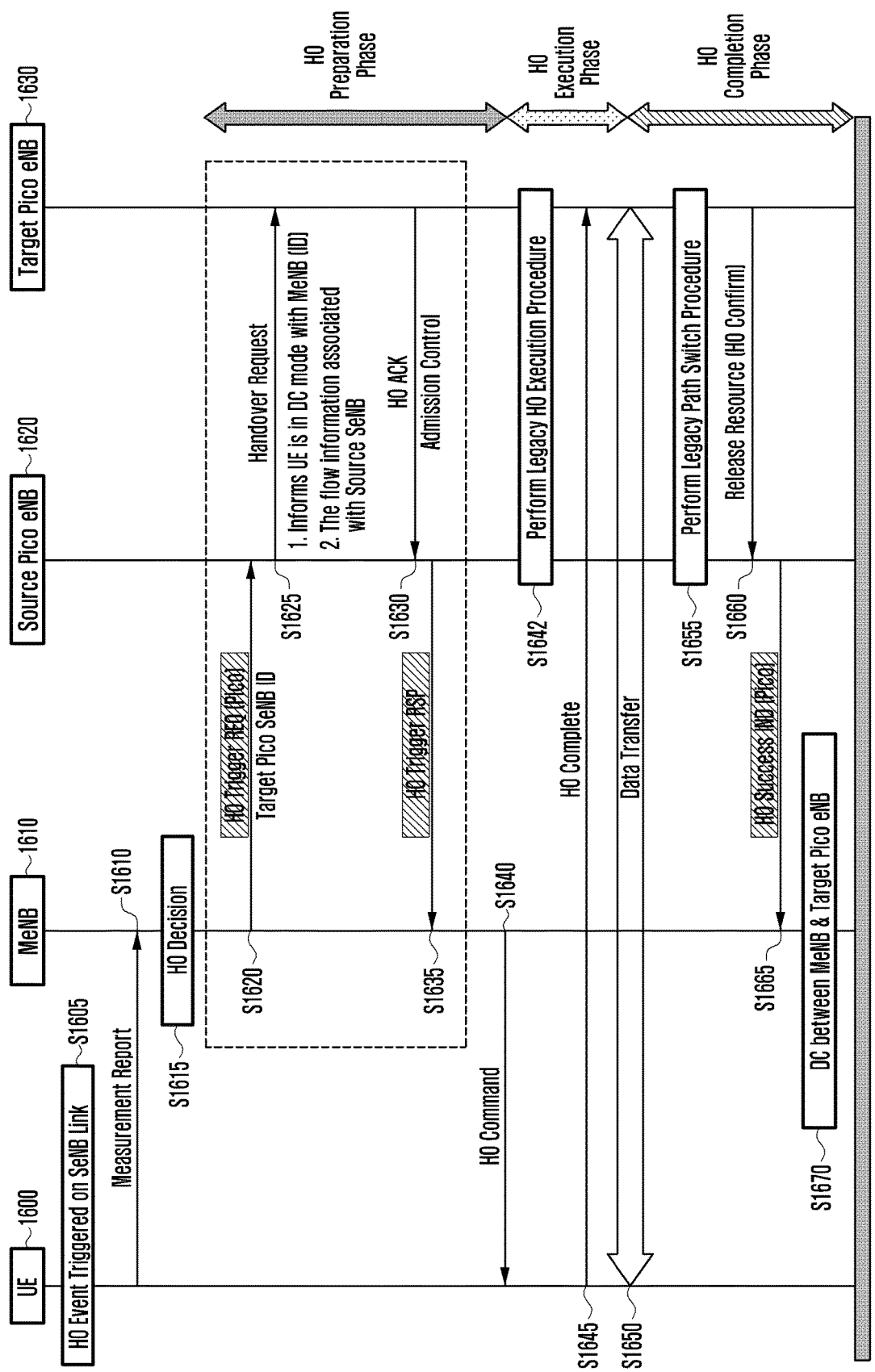
FIG. 16 is a signaling diagram illustrating an HO process, according to another embodiment of the present invention.

FIG. 16 is a signaling diagram illustrating an HO process, according to another embodiment of the present invention.

A UE 1600 first detects triggering of an HO event on the pico link, at step S1605. Then, the UE 1600 transmits a measurement report to an MeNB 1610, at step S1610.

The MeNB 1610 determines whether to perform the HO, at step S1615. In the determination, the MeNB 1610 transmits an HO trigger request message (pico) to a source pico eNB 1620, at step S1620. The HO trigger request message may include identification information of the target pico eNB 1630.

The source pico eNB 1620 transmits an HO request message to the target pico eNB 1630, at step S1620. The HO request message may include information indicating that the UE 1600 is in the dual connectivity mode, identification information of the MeNB 1610 connected to the UE 1600 through dual connectivity, and flow information related to the source pico eNB 1620.

Then, the target pico eNB 1630 transmits an HO Ack message to the source pico eNB 1620, at step S1630, and the source pico eNB 1620 transmits an HO trigger response message to the MeNB 1610, at step S1635.

The MeNB 1610 transmits an HO command message to the UE 1600, at step S1640.

Thereafter, at step S1642, a conventional HO execution process is performed between the source pico eNB 1620 and the target pico eNB 1630. Further, the target pico eNB 1630 transmits an HO completion message to the HE 1600, at step S1645.

Thereafter, the UE 1600 and the target pico eNB 1630 transmit/receive data to/from each other.

At step S1655, the conventional path switch process is performed between the source pico eNB 1620 and the target pico eNB 1630. Then, the target pico eNB 1630 transmits a resource release message (HO Ack) to the source pico eNB 1620, at step S1660. Then, the source pico eNB 1620 transmits an HO success indicator (pico) to the MeNB 1610, at step S1665.

At step S1670, dual connectivity is formed between the MeNB 1610 and the target pico eNB 1630.

Main characteristics of the embodiment of FIG. 16 are summarized as tallows.
HO Preparation Phase
HO trigger REQ
Source macro→source pico
Trigger conventional HO between source and target pico eNBs
HO request
  Source pico→target pico
  Indicate that UE is in DC state with source macro (ID)
HO trigger RSP
Source pico→source macro
Source macro eNB transmits HO command to UE
HO Execution Phase
Apply conventional HO process
HO Completion Phase
Apply conventional HO process
HO success IND
Source pico→source macro
Source macro can perform DC together with target pico HO Request
Indicate UE DC mode (together with source macro ID)
Target pico readily accepts DC mode
HO Trigger REQ
Target pico ID
Trigger conventional HO together with target pico
UE ID
HO Trigger RSP
Success/Failure
Trigger HO command to UE
HO Success IND
Pico layer
Source macro performs DC with target pico
UE ID FIG. 17 is a block diagram illustrating an internal structure of an eNB which can be applied to various eNBs, according to an embodiment of the present invention.

Figure 17:
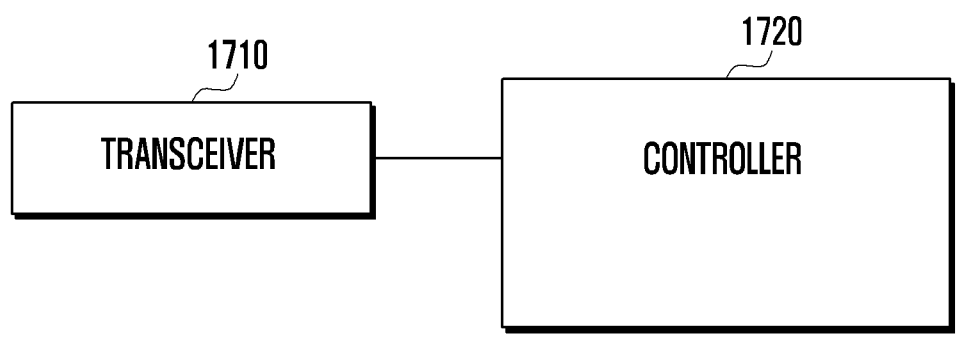
FIG. 17 is a block diagram illustrating an internal structure of an eNB which can be applied to various eNBs, according to an embodiment of the present invention.

The internal structure of the eNB illustrated in FIG. 17 may be an internal structure of any eNB such as a macro eNB or a pico eNB, and changes may be made such that the characteristics described in each of the embodiments are executed by functions performed by a controller according to various embodiments of the present invention.

For example, a transceiver 1710 may transmit/receive a signal to/front a UE or another eNB. The eNB may transmit/receive a signal such as a control signal or data to/from the UE through a radio channel. Further, the eNB may transmit/receive a measurement report message transmitted from the UE through the transceiver 1710. One eNB may be connected to another eNB or nodes (for example, SGW air MME) in a core network through a wired interface to transmit/receive signals.

A controller 1720 may control signal flows between blocks of the UE to support the HO of the UE in a wireless communication system in which the eNB supports dual connectivity, according to an embodiment of the present invention.

For example, when the eNB is a master eNB and a pico eNB is handed over, the controller 1720 may transmit an HO request message to a target slave eNB when a slave eNB HO for the UE is determined. Further, when a HO Ack message is received from the target slave eNB, the controller 1720 may transmit an HO trigger request message including identification information of the target slave eNB to a source slave eNB. Further, when a resource release message is received from the target slave eNB, the controller 1720 may transmit an HO success indicator to the source slave eNB.

In contrast, when the eNB is a master eNB and a macro eNB is handed over, the controller 1720 may transmit an HO request message to as target master eNB when a master eNB HO for the UE is determined. When receiving a HO Ack message from the target master eNB, the controller 1720 may transmit an HO trigger indicator to a source slave eNB. Further, when a resource release message is received from the target macro eNB, the controller 1720 may transmit an HO success indicator to the source slave eNB.

As described above, the block diagram illustrating the internal structure of the eNB of FIG. 17 may be construed so that the respective eNBs perform various functions in the various embodiments described above.

In all the above embodiments, data and state forwarding may include one or more downlink PDCP (Packet Data Convergence Protocol) state reports, authorized downlink PDUs, and unauthorized uplink PDUs. According to an embodiment of the present invention, instead of forwarding the data and state to the target eNB, the salve eNB transmits the data and state to the master eNB and sequentially forwards the data and state to the target eNB. According to another embodiment of the present invention, the master eNB may buffer data transmitted to the salve eNB in a RAN split model, hi this case, the slave eNB does not transmit unauthorized downlink PDUs to the master eNB.

According to an embodiment, when the HO of the master eNB is triggered, additional data may be pushed to the salve eNB for data transmission to the UE. In uplink, the UE may make a request for additional resources to transmit the additional data to the salve eNB. When the UE receives an HO command for the master eNB, the UE transmits a Buffer Status Report (BSR) to the slave eNB by including pending data to be transmitted to the master eNB.

In all the above embodiments, the master eNB was referred to as the master eNB and the piers eNB was referred to as the slave eNB. However, a predetermined type eNB may operate as the master or slave eNB.

According to the above described embodiments of the present invention, an efficient UE HO process can be performed in a wireless communication system supporting dual connectivity.

While the present invention has been shown and described with reference to various embodiments thereof, it should be understood by those skilled in the art that many variations and modifications of the method and apparatus described herein will still fall within the spirit and scope of the present invention as defined in the appended claims and their equivalents.

What is claimed is:

1. A method performed by a master base station in a wireless communication system, the method comprising:
   transmitting, to a target secondary base station, a request message for a handover of a user equipment (UE) from a source secondary base station to the target secondary base station;
   receiving, from the target secondary base station, an acknowledgment message in response to the request message; and
   transmitting, to the source secondary base station, a message including an identifier for data forwarding for a radio access network (RAN) split bearer,
   wherein data is forwarded from the source secondary base station to the target secondary base station based on the identifier, and
   wherein a handover procedure with a core network is not triggered for the RAN split bearer that is configured for the master base station and the source secondary base station.

2. The method of claim 1, wherein the identifier for data forwarding includes an identifier of the target secondary base station, and
   wherein the request message includes information indicating that the UE is in a dual connectivity mode.

3. The method of claim 1, further comprising:
   transmitting, to the UE, a trigger message for the UE to apply a new configuration based on configuration information included in the request message.

4. A method performed by a source secondary base station in a wireless communication system, the method comprising:
   receiving, from a master base station, a message including an identifier for data forwarding for a radio access network (RAN) split bearer in case that a handover of a user equipment (UE) from the source secondary base station to a target secondary base station is requested;
   forwarding data for the UE to the target secondary base station based on the identifier; and releasing resources associated with the UE,
wherein a handover procedure with a core network is not triggered for the RAN split bearer that is configured for the master base station and the source secondary base station.

5. The method of claim 4, wherein the identifier for data forwarding includes an identifier of the target secondary base station, and
wherein information indicating that the UE is in a dual connectivity mode is transmitted from the master base station to the target secondary base station.

6. The method of claim 4, further comprising:
transferring a UE context to the target secondary base station based on the identifier for data forwarding.

7. A method performed by a target secondary base station in a wireless communication system, the method comprising:
receiving, from a master base station, a request message for a handover of a user equipment (UE) from a source secondary base station to the target secondary base station;
transmitting, to the master base station, an acknowledgment message in response to the request message; and
receiving, from the source secondary base station, data for the UE that is transmitted based on a data forwarding identifier for data forwarding for a radio access network (RAN) split bearer,
wherein the data forwarding identifier is transmitted from the master base station to the source secondary base station, and
wherein a handover procedure with a core network is not triggered for the RAN split bearer that is configured for the master base station and the source secondary base station.

8. The method of claim 7,
wherein the data forwarding identifier includes an identifier of the target secondary base station, and
wherein the request message includes information indicating that the UE is in a dual connectivity mode.

9. The method of claim 7, further comprising:
synchronizing with the UE.

10. A master base station in a wireless communication system, the master base station comprising:
a transceiver; and
a controller configured to:
transmit, via the transceiver to a target secondary base station, a request message for a handover the of a user equipment (UE) from a source secondary base station to the target secondary base station,
receive, via the transceiver from the target secondary base station, an acknowledgment message in response to the request message, and
transmit, via the transceiver to the source secondary base station, a message including an identifier for data forwarding for a radio access network (RAN) split bearer,
wherein data is forwarded from the source secondary base station to the target secondary base station based on the identifier, and
wherein a handover procedure with a core network is not triggered for the RAN split bearer that is configured for the master base station and the source secondary base station.

11. The master base station of claim 10, wherein the identifier for data forwarding includes an identifier of the target secondary base station, and
wherein the request message includes information indicating that the UE is in a dual connectivity mode.

12. The master base station of claim 10, wherein the controller transmits, to the UE, a trigger message for the UE to apply a new configuration based on configuration information included in the request message.

13. A source secondary base station in a wireless communication system, the source secondary base station comprising:
a transceiver; and
a controller configured to:
receive, via the transceiver from a master base station, a message including an identifier for data forwarding for a radio access network (RAN) split bearer in case that a handover of a user equipment (UE) from the source secondary base station to a target secondary base station is requested,
forward data for the UE to the target secondary base station based on the identifier, and
release resources associated with the UE,
wherein a handover procedure with a core network is not triggered for the RAN split bearer that is configured for the master base station and the source secondary base station.

14. The source secondary base station of claim 13, wherein the identifier for data forwarding includes an identifier of the target secondary base station, and
wherein information indicating that the UE is in a dual connectivity mode is transmitted from the master base station to the target secondary base station.

15. The source secondary base station of claim 13, wherein the controller is further configured to transfer a UE context to the target secondary base station based on the identifier for data forwarding.

16. A target secondary base station in a wireless communication system, the target secondary base station comprising:
a transceiver; and
a controller configured to:
receive, via the transceiver from a master base station, a request message for a handover the of a user equipment (UE) from a source secondary base station to the target secondary base station,
transmit, via the transceiver to the master base station, an acknowledgment message in response to the request message, and
receive, via the transceiver from the source secondary base station, data for the UE that is transmitted based on a data forwarding identifier for data forwarding for a radio access network (RAN) split bearer,
wherein the data forwarding identifier is transmitted from the master base station to the source secondary base station, and
wherein a handover procedure with a core network is not triggered for the RAN split bearer that is configured for the master base station and the source secondary base station.

17. The target secondary base station of claim 16,
wherein the identifier for data forwarding includes an identifier of the target secondary base station, and
wherein the request message includes information indicating that the UE is in a dual connectivity mode.

18. The target secondary base station of claim 16, wherein the controller is further configured to synchronize with the UE.

* * * * *